US009648229B2

(12) United States Patent
Kinoshita

(10) Patent No.: US 9,648,229 B2
(45) Date of Patent: May 9, 2017

(54) IMAGE PROCESSING DEVICE AND ASSOCIATED METHODOLOGY FOR DETERMINING A MAIN SUBJECT IN AN IMAGE

(71) Applicant: SONY CORPORATION, Minato-ku (JP)

(72) Inventor: Masaya Kinoshita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 14/380,149

(22) PCT Filed: Mar. 18, 2013

(86) PCT No.: PCT/JP2013/057648
§ 371 (c)(1),
(2) Date: Aug. 21, 2014

(87) PCT Pub. No.: WO2013/153919
PCT Pub. Date: Oct. 17, 2013

(65) Prior Publication Data
US 2015/0016683 A1    Jan. 15, 2015

(30) Foreign Application Priority Data

Apr. 9, 2012   (JP) .................................. 2012-088247

(51) Int. Cl.
*H04N 5/232*       (2006.01)
*G06T 7/215*       (2017.01)
(Continued)

(52) U.S. Cl.
CPC ....... *H04N 5/23219* (2013.01); *G01S 3/7864* (2013.01); *G06T 7/215* (2017.01);
(Continued)

(58) Field of Classification Search
CPC ........... H04N 5/23219; H04N 5/23212; H04N 5/23254; H04N 5/23222; G06T 7/204;
(Continued)

(56) References Cited

U.S. PATENT DOCUMENTS 6,784,927 B1 * 8/2004 Itokawa ............. H04N 5/23248
348/169
8,149,911 B1 * 4/2012 Alvarez .................. G06T 5/003
375/240.12
(Continued)

FOREIGN PATENT DOCUMENTS

JP     2009-290827 A    12/2009
JP     2010-193476 A     9/2010
(Continued)

OTHER PUBLICATIONS

Buchanan, Aeron, and Andrew Fitzgibbon. "Combining local and global motion models for feature point tracking." Computer Vision and Pattern Recognition, 2007. CVPR'07. IEEE Conference on. IEEE, 2007.*
(Continued)

*Primary Examiner* — Andrew W Johns
*Assistant Examiner* — Menatoallah Youssef
(74) *Attorney, Agent, or Firm* — Oblon, McClelland, Maier & Neustadt, L.L.P.

(57) ABSTRACT

Provided is an image processing device including a global motion detection unit configured to detect a global motion indicating a motion of an entire image, a local motion detection unit configured to detect a local motion indicating a motion of each of areas of an image, and a main subject determination unit configured to determine a main subject based on the global motion and the local motion.

17 Claims, 20 Drawing Sheets

(51) Int. Cl.
*G01S 3/786* (2006.01)
*G06T 7/246* (2017.01)

(52) U.S. Cl.
CPC ......... *G06T 7/248* (2017.01); *H04N 5/23212* (2013.01); *H04N 5/23222* (2013.01); *H04N 5/23254* (2013.01); *G06T 2207/10004* (2013.01); *G06T 2207/10016* (2013.01); *G06T 2207/20021* (2013.01); *G06T 2207/30201* (2013.01)

(58) Field of Classification Search
CPC ......... G06T 7/2006; G06T 2207/20021; G06T 2207/30201; G06T 2207/10004; G06T 2207/10016; G01S 3/7864
See application file for complete search history.

(56) References Cited

U.S. PATENT DOCUMENTS

| | | | | |
|---|---|---|---|---|
| 2002/0196362 | A1* | 12/2002 | Yang | H04N 7/012 348/452 |
| 2010/0020244 | A1* | 1/2010 | Mitsuya | G06T 7/2026 348/699 |
| 2010/0060727 | A1* | 3/2010 | Steinberg | G06K 9/00228 348/77 |
| 2011/0150284 | A1* | 6/2011 | Son | G06T 7/2026 382/103 |
| 2012/0206619 | A1* | 8/2012 | Nitta | H04N 5/23219 348/222.1 |

FOREIGN PATENT DOCUMENTS

| | | | |
|---|---|---|---|
| JP | 20100193476 | * | 9/2010 |
| JP | 2011-146826 A | | 7/2011 |
| JP | 2011-146827 A | | 7/2011 |
| JP | 2011-160379 A | | 8/2011 |
| JP | 2011-166305 A | | 8/2011 |

OTHER PUBLICATIONS

International Search Report issued Apr. 16, 2013 in PCT/JP2013/057648.

* cited by examiner

FIG. 6
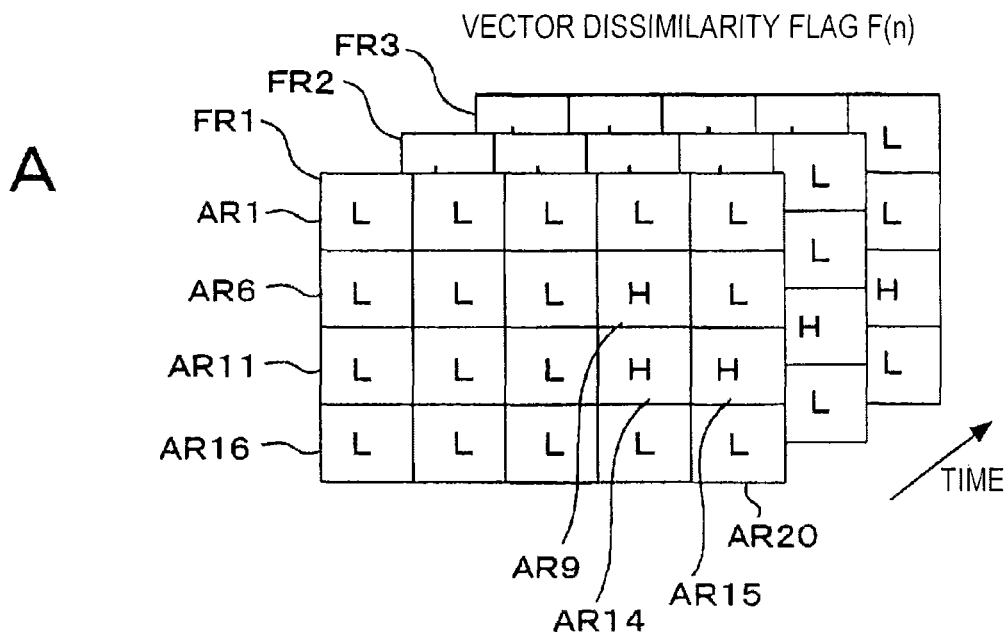
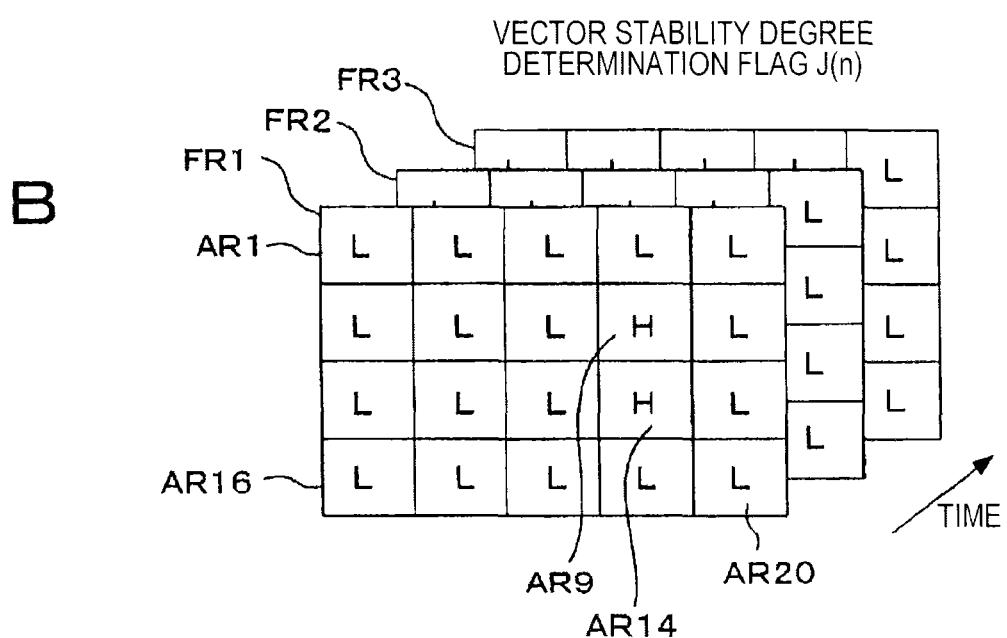

FIG. 15
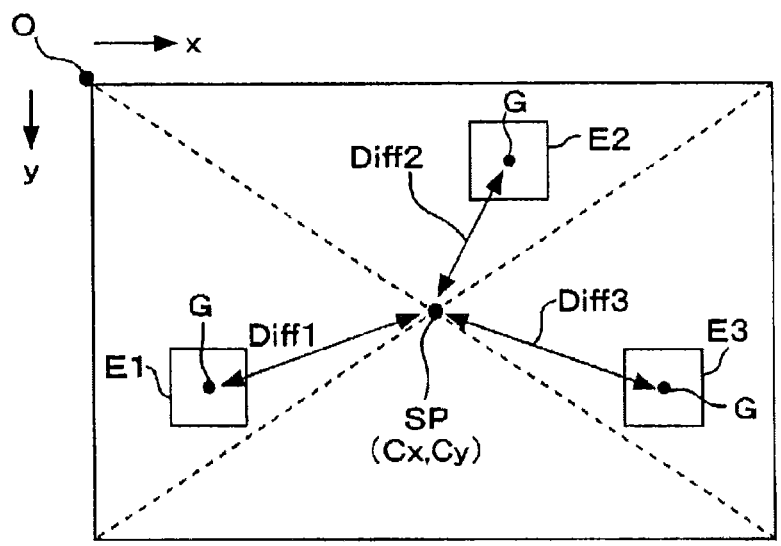
A
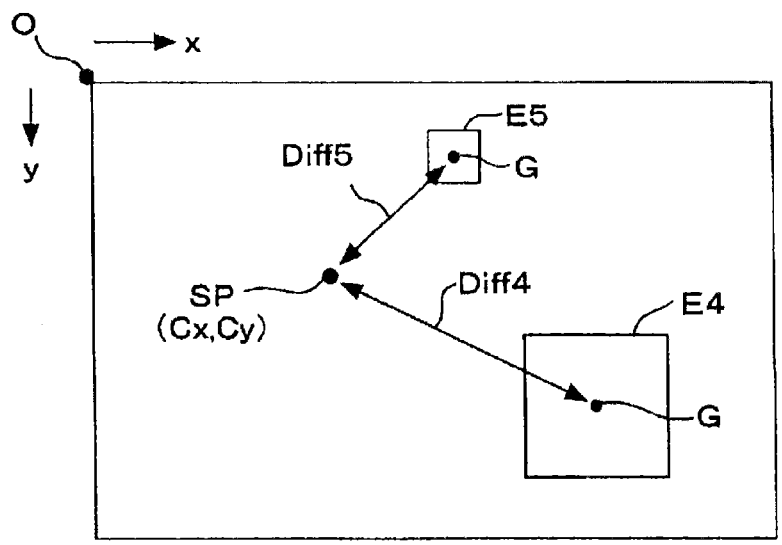
B

IMAGE PROCESSING DEVICE AND ASSOCIATED METHODOLOGY FOR DETERMINING A MAIN SUBJECT IN AN IMAGE

TECHNICAL FIELD

The present disclosure relates to an image processing device, an image processing method, and a program for performing a process of determining a main subject in an image.

BACKGROUND ART

Recent digital still cameras and digital video cameras normally have a facial detection function, and have a function of optimally matching various parameters (focus, brightness and the like) of the camera according to facial position and area.

On the other hand, Patent Literature 1 discloses a technique in which a user designates and selects a "main subject" that is a target subject to be tracked in a captured image.

In addition, if the techniques disclosed in Patent Literatures 2, 3, and 4 described above are used, for example, subject tracking that encompasses a frame of the whole body of an arbitrary subject can be realized.

In addition, there are also functions of controlling an optical system and the like such as autofocus and automatic exposure such that a desired area in a captured image is detected and traced so as to optimize the area.

As described above, technologies of tracking an image designated by a user as a main subject, for example, an image area such as a face in a captured image, focusing on the face area, and the like are known.

CITATION LIST

Patent Literature

Patent Literature 1: JP 2011-166305A
Patent Literature 2: JP 2011-146826A
Patent Literature 3: JP 2011-146827A
Patent Literature 4: JP 2011-160379A

SUMMARY OF INVENTION

Technical Problem

However, in a captured image, a desired area that is subject to tracking or focusing, i.e., a "main subject," is decided by a photographer by directly selecting one candidate from "a plurality of candidate areas" obtained from various detectors using any method at present.

In a state of holding a camera, for example, a main subject is chosen through an action of selecting an arbitrary face from a plurality of faces projected on a through image displayed on a screen (a monitoring image of a subject displayed at times other than at a time of operating a shutter) on a touch panel. Alternatively, a subject present in a predetermined area is set to be a main subject at a time designated by a user (half-pressing of a shutter or the like).

However, when a user interface is considered in actual use examples, there are cases in which the action of "selecting a main subject by a photographer" itself is difficult.

For example, when a user wants to use a function of maintaining focus on a subject that is moving around, it is difficult for the user to select the subject using his or her finger holding a camera while targeting the subject.

For example, there are cases in which designation is difficult due to a speed of a reaction of a user to changes (movements) of a subject. For example, there is a case in which it is difficult to precisely designate a subject that is moving around on a screen of a through image.

In addition, in a situation in which a user holds a camera in his or her hand in the first place and turns the camera toward the subject to choose the subject, it is difficult for the user to perform the action of selecting a main subject using his or her finger on a screen. Particularly, in a situation in which a subject is tracked, for example, in which a user changes an imaging direction to cause a camera to move for panning or tilting, it is almost not possible to select a main subject.

In addition, there is a case in which it is difficult for a use to select a subject in resolution of a display screen in which a touch panel is arranged.

In addition, there is also a case in which it is difficult to properly designate a desired subject depending on a size of the subject on a display screen in which a touch panel is arranged and a size (thickness) of a user's finger.

In addition, there is also a case in which it is difficult for a user to properly designate a subject due to a time lag of a camera system, for example, a time lag between actual scenery and a through image of a captured image.

Furthermore, when such a designation operation is to be performed during imaging and recording of a dynamic image, there may be cases where image shaking caused by an action of selecting a main subject may be recorded as it is, or an user may be forced to take an action of re-selection at the time of frame-out or tracking loss (failure) caused by temporary shielding, or the like.

As described above, hand-held type cameras have a problem in that the action of selecting a main subject itself is difficult in many use examples that require the function, which is stressful for photographers.

Therefore, the present disclosure aims to realize a technology of determining a target subject desired by a user such as a photographer and setting the subject as a main subject without an action of the user intentionally selecting the subject.

Solution to Problem

According to the present disclosure, there is provided an image processing device including a global motion detection unit configured to detect a global motion indicating a motion of an entire image, a local motion detection unit configured to detect a local motion indicating a motion of each of areas of an image, and a main subject determination unit configured to determine a main subject based on the global motion and the local motion.

According to the present disclosure, there is provided an image processing method including detecting a global motion that indicates a motion of an entire image, detecting a local motion that indicates a motion of each of areas in an image, and determining a main subject based on the global motion and the local motion. According to the present disclosure, there is provided a program for causing an arithmetic operation processing device to execute those processes.

According to the technology of the present disclosure, a main subject determination process for automatically determining a main subject with respect to image data is performed. A global motion indicating a motion of an entire image is a relative motion of all subjects appearing in the image with respect to an imaging apparatus at the time of imaging. On the other hand, a local motion indicating a local motion indicating a motion of each area in an image is a relative motion of each of subjects appearing in the image (subject image of each of areas in the image) with respect to an imaging apparatus at the time of imaging.

For example, when a user aims at a subject that he or she wants to have as a target of imaging while holding an imaging apparatus, he or she gradually changes an imaging direction in accordance with a motion of the subject. Thus, the subject that the user regards as a main subject has a small motion in an image (a relative motion with respect to the imaging apparatus) within images spanning a plurality of frames. On the other hand, as the imaging direction is changed, a motion of the entire image, i.e., a global motion, is great. Consequently, a local vector of an area in the image in which the subject targeted by the user appears is significantly different from a global vector.

Based on the difference between the local vector and the global vector, a subject that the user regards as a main subject or a main character can be estimated. and accordingly, automatic main subject determination is possible.

Advantageous Effects of Invention

According to the present disclosure, a main subject is automatically determined in a captured image, and thus it is not necessary for a user such as a photographer to perform an action of selecting the main subject. Accordingly, enhancement of product-added value including improvement of operability when imaging is performed using the imaging apparatus in which the image processing device of the present disclosure is mounted held in a hand, a reduction of stress on users, and further realization of various functions caused by automatic main subject determination can be realized.

BRIEF DESCRIPTION OF DRAWINGS

FIG. 6 is an illustrative diagram of a vector dissimilarity flag and a time stability degree determination flag of an embodiment.

FIG. 15 is an illustrative diagram of distances between candidate image frames and determination reference points of the embodiment.

DESCRIPTION OF EMBODIMENTS

Hereinafter, embodiments will be described in the following order.

<1. Configuration of an image processing device>
<2. Configuration of an imaging apparatus>
<3. Opportunity and objective of main subject determination, etc.>
<4. First embodiment>
<5. Second embodiment>
<6. Third embodiment>
<7. Application to a program and a computer device>
<8. Modified example>

1. Configuration of an Image Processing Device

Figure 1:
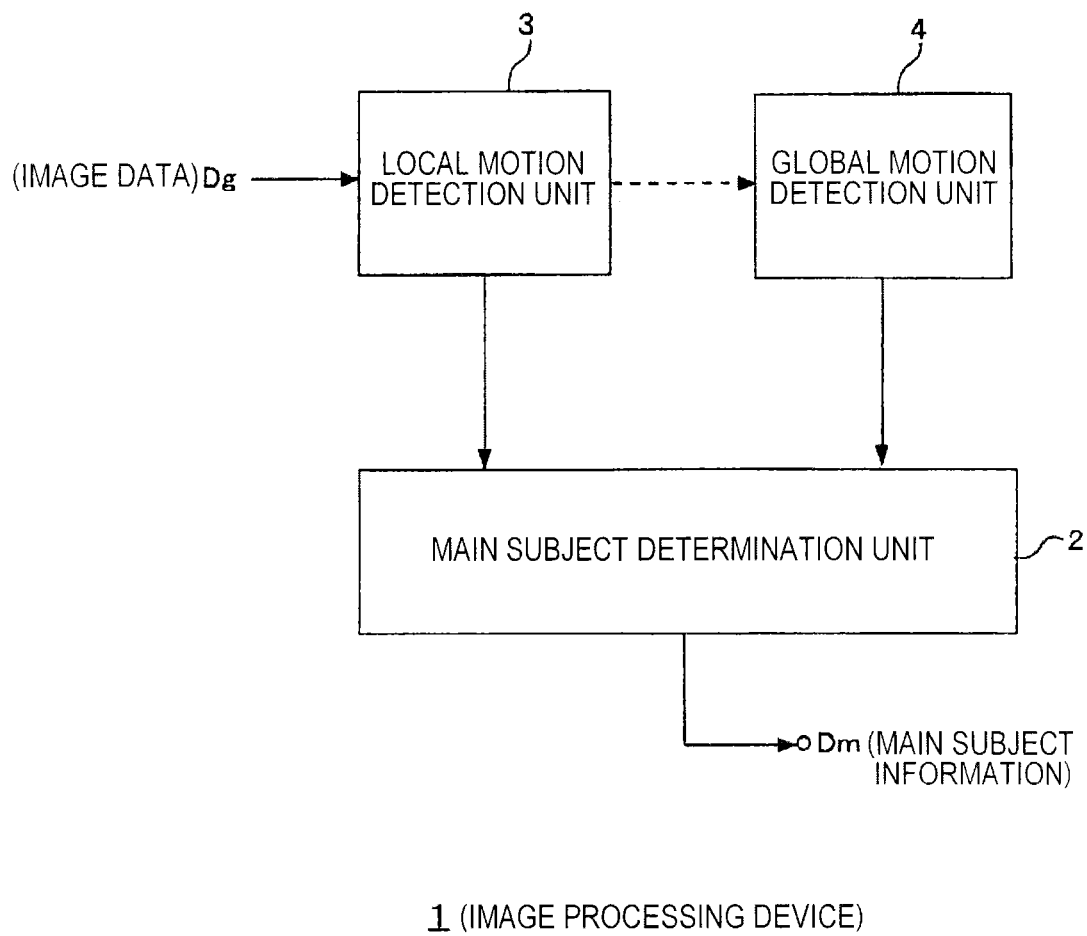
FIG. 1 is a block diagram of a configuration example of an image processing device of an embodiment of the present disclosure.

FIG. 1 shows a configuration example of an image processing device of an embodiment.

The image processing device 1 has a main subject determination unit 2, a local motion detection unit 3, and a global motion detection unit 4.

The local motion detection unit 3 detects local motions indicating motions of each area in images from frame images sequentially input as image data Dg. For example, an entire image of one frame is divided into a plurality of areas, and information of a motion of a subject in each area is detected from differences of frames of the areas. A local motion refers to a relative motion of each subject appearing in an image (subject of each of the areas in the image) with respect to an imaging apparatus at the time of imaging.

Information of such a local motion indicating a relative motion with respect to each area may be, for example, information of a motion vector (direction and quantity (scalar)), information of a motion direction, information of a motion quantity, or the like.

Thus, the local motion detection unit 3 gradually supplies such information of a motion with respect to each area to the main subject determination unit 2 as information of a local motion.

The global motion detection unit 4 detects a global motion indicating a motion of an entire image. A global motion refers to a relative motion of all subjects appearing in an image with respect to an imaging apparatus at the time of imaging. As information of such a global motion indicating a relative motion of an entire image, for example, there are information of a motion vector (direction and quantity (scalar)), information of a motion direction, information of a motion quantity, and the like according to information of a local motion.

The information of a global motion can be detected through, for example, an arithmetic operation process that uses a local motion of each area of a screen.

In addition, when the image processing device is mounted in an imaging apparatus, information of a global motion can also be generated from information of a sensor (for example, an angular velocity sensor, an acceleration sensor, or the like) that detects motions of the imaging apparatus itself. Furthermore, also when the image processing device 1 is mounted in equipment that is connected to an imaging apparatus at the time of imaging, information of a global motion can be generated by receiving and inputting information of a sensor that likewise detects a motion of the imaging apparatus itself. In other words, information of a global motion can be obtained without using information of a local motion.

Thus, the global motion detection unit 4 gradually supplies information of a global motion to the main subject determination unit 2.

The main subject determination unit 2 performs a main subject determination process based on a global motion and a local motion.

For example, the main subject determination unit 2 compares information of local motions of each area to information of global motions. Then, an area that has a difference between a global motion and a local motion is presumed as an area in which a main subject appears, and the image of the area (subject) is determined as a main subject.

Then, the main subject determination unit 2 outputs main subject information Dm as a determination result.

Note that the image processing device 1 that has the main subject determination unit 2, the local motion detection unit 3, and the global motion detection unit 4 above can be realized by a CPU (Central Processing Unit) or a DSP (Digital Signal Processor) as an arithmetic operation processing device.

In addition, realizing the function of the main subject determination unit 2 by a CPU or the like, and realizing the functions of the local motion detection unit 3 and the global motion detection unit 4 by a DSP for image processing or the like connected to the CPU may also be considered.

Figure 2:
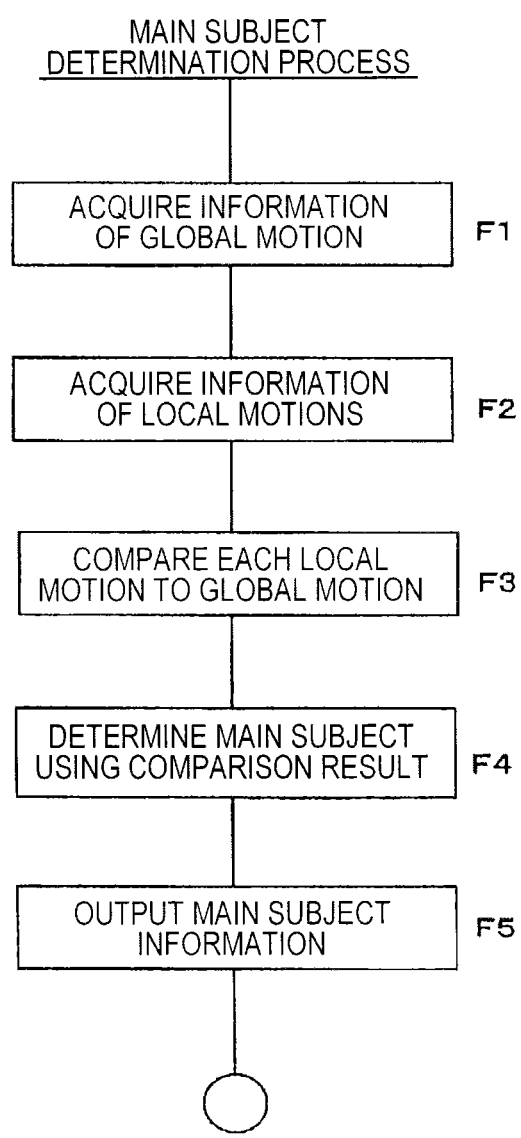
FIG. 2 is a flowchart of a main subject determination process of the image processing device of the embodiment.

The flow of the main subject determination process performed by the main subject determination unit 2 of the image processing device 1 is as shown in FIG. 2.

The main subject determination unit 2 acquires the information of the global motions in Step F1. In other words, the information of the global motions detected by the global motion detection unit 4 is taken.

In addition, the main subject determination unit 2 acquires the information of the local motions in Step F2. In other words, the information of the local motions with respect to each area of an image which are detected by the local motion detection unit 3 is taken.

The main subject determination unit 2 compares the information of the local motions of each area to the information of the global motions in Step F3.

The main subject determination unit 2 determines a main subject using the comparison result in Step F4.

As determination methods, for example, the following examples are considered.

A subject of an area in which a local motion has the greatest difference from a global motion is set as a main subject.

One or more areas in which local motions are different from global motions by a predetermined value or higher are extracted, and each subject in the extracted one or plurality of areas is set as one or more main subjects.

One or more areas in which local motions are different from global motions by a predetermined value or higher are extracted, and a subject of an area selected from the extracted one or plurality of areas is set as a main subject.

One or more areas in which local motions are different from global motions by a predetermined value or higher are extracted, and one or more subjects extracted from the extracted one or plurality of areas are set as one or more main subjects.

One or more areas in which local motions are different from global motions by a predetermined value or higher are extracted, and a subject selected among one or more subjects extracted from the extracted one or plurality of areas is set as a main subject.

Detection of information of global motions and information of local motions of Steps F1 and F2 is continuously performed, and a subject of an area in which a local motion is determined to be stably most dissimilar to a global motion under a time condition is set as a main subject.

Detection of information of global motions and information of local motions of Steps F1 and F2 is continuously performed, and subjects of one or more areas in which local motions are determined to be stably most dissimilar to global motions under a time condition are set as main subjects.

Detection of information of global motions and information of local motions of Steps F1 and F2 is continuously performed, and a subject of an area selected among one or more areas in which local motions are determined to be stably most dissimilar to global motions under a time condition is set as a main subject.

Detection of information of global motions and information of local motions of Steps F1 and F2 is continuously performed, and one or more subjects extracted from one or more areas in which local motions are determined to be stably most dissimilar to global motions under a time condition are set as one or more main subjects.

Detection of information of global motions and information of local motions of Steps F1 and F2 is continuously performed, and a subject selected among one or more subjects extracted from one or more areas in which local motions are determined to be stably most dissimilar to global motions under a time condition is set as a main subject.

Other determination methods are also considered, however, after a main subject is determined using the methods, for example, the main subject determination unit 2 transfers the main subject information Dm to an application program or the like in Step F5.

In the application program or the like, a process is performed as an image set as a main subject is specified. For example, focus control, a tracking process, an image effect process, or the like are included.

As described above, the main subject determination process is performed by the image processing device 1.

In the main subject determination process, main subject determination is performed using the comparison result of the information of the local motions and the information of the global motions. When, for example, a photographer holding a camera changes an imaging direction aiming at a target, a relative motion of the subject as a target with respect to the imaging apparatus is small. This is because the photographer changes the imaging direction of the imaging apparatus to perform panning, tilting, and the like according to motions of the subject in order to, for example, confine the subject that he or she wants to set as a target within an image.

Then, a local motion becomes small in the area of the subject that the user wants to set as a target even though a global motion of the entire image is large. Due to such a difference of information of the motions, a subject that the user intends to set as a target can be estimated. Thus, without resorting to manual manipulation of the user, main subject determination can be automatically performed. Ultimately, as a main subject is automatically determined, and the image processing device 1 of FIG. 1 is mounted in various kinds of electronic equipment that performs operations according to setting of a main subject, manipulation performance of the user is dramatically improved.

2. Configuration of an Imaging Apparatus

Hereinbelow, a main subject determination operation will be described in detail exemplifying an imaging apparatus 10 in which the image processing device is mounted as described above.

Figure 3:
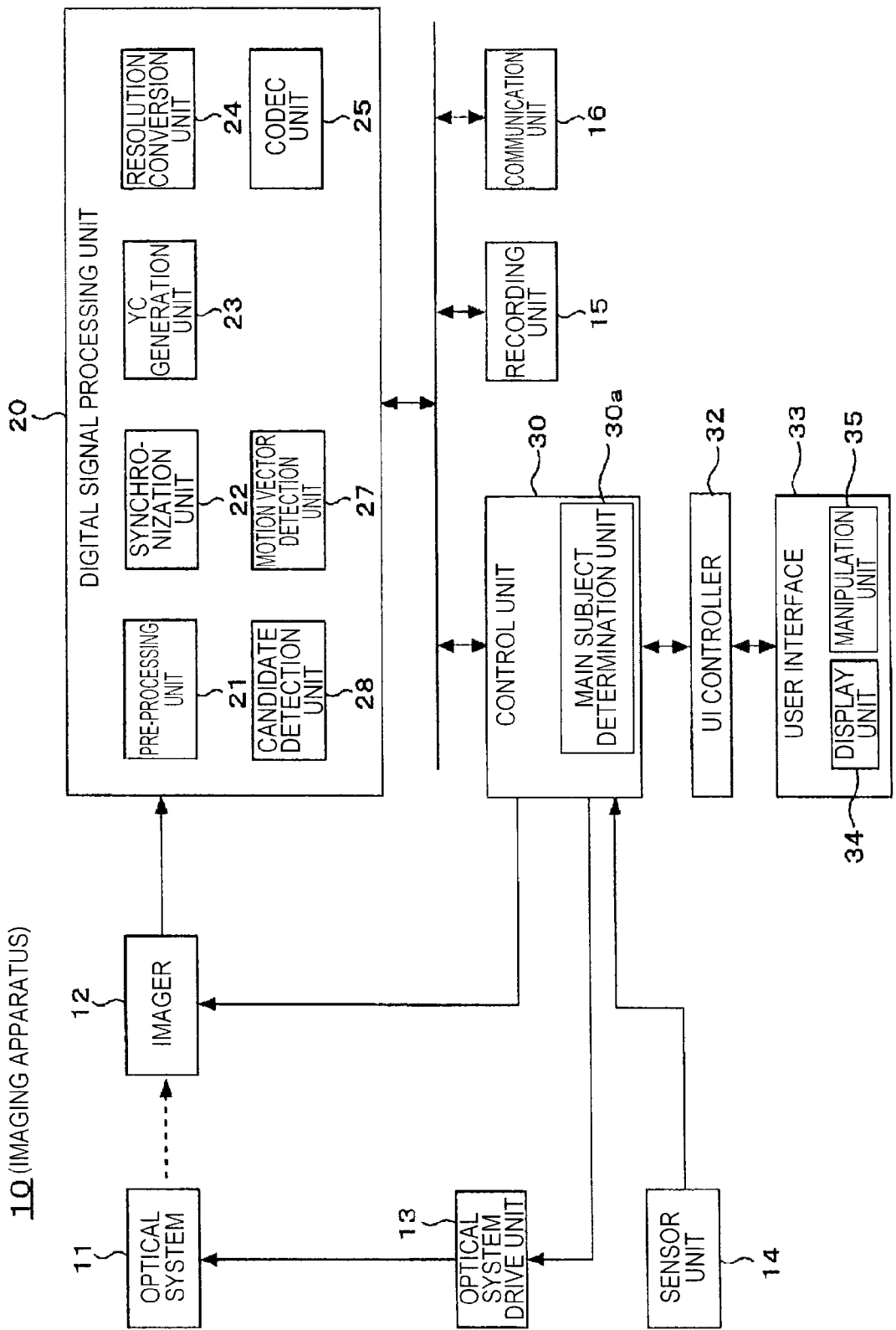
FIG. 3 is a block diagram of an imaging apparatus of an embodiment.

A configuration example of the imaging apparatus 10 of an embodiment is shown in FIG. 3. The imaging apparatus 10 is configured to be a so-called digital still camera or a digital video camera which is equipment that images and records still images and dynamic images in which the image processing device mentioned in the claims is mounted.

The imaging apparatus 10 shown in FIG. 3 has an optical system 11, an imager 12, an optical system drive unit 13, a sensor unit 14, a recording unit 15, a communication unit 16, a digital signal processing unit 20, a control unit 30, a user interface controller (hereinafter, "UI controller") 32, and a user interface 33.

The optical system 11 has lenses such as a cover lens, a zoom lens, and a focus lens and a throttle mechanism. By this optical system 11, light from a subject is collected in the imager 12.

The imager 12, for example, has a CCD (Charge Coupled Device) type or CMOS (Complementary Metal OxideSemiconductor) type imaging sensor.

The imager 12, for example, performs a CDS (Correlated Double Sampling) process, an AGC (Automatic Gain Control) process and the like for an electrical signal obtained through photoelectric conversion in the imaging sensor, and further performs an A-D (Analog-Digital) conversion process. Then, the imager 12 outputs an imaging signal as digital data to the digital signal processing unit 20 of a rear stage.

The optical system drive unit 13 drives the focus lens of the optical system 11 and performs a focus operation under the control of the control unit 30. Furthermore, the optical system drive unit 13 drives the throttle mechanism of the optical system 11 and performs exposure adjustment under the control of the control unit 30. Moreover, the optical system drive unit 13 drives the zoom lens of the optical system 11 and performs a zoom operation under the control of the control unit 30.

The digital signal processing unit 20, for example, is configured as an image processor by a DSP and the like. The digital signal processing unit 20 performs various types of signal processes for a digital signal (captured image signal) from the imager 12.

For example, the digital signal processing unit 20 includes a pre-processing unit 21, a synchronization unit 22, a YC generation unit 23, a resolution conversion unit 24, a codec unit 25, a candidate detection unit 26, and a motion vector detection unit 27.

The pre-processing unit 21 performs a clamping process of clamping a black level of R, G, and B to a predetermined level, or a correction process among color channels of R, G, and B with respect to the captured image signal from the imager 12.

The synchronization unit 22 performs a demosaicing process such that image data for each pixel has color components of all of R, G, and B.

The YC generation unit 23 generates (separates) a luminance (Y) signal and a color (C) signal from the image data of R, G, and B.

The resolution conversion unit 24 executes a resolution conversion process on the image data on which various types of signal processes have been performed.

The codec unit 25, for example, performs a coding process for recording or communication with respect to the image data for which the resolution conversion has been performed.

The motion vector detection unit 27 detects a local vector that is an example of information of a local motion described above. Alternatively, the motion vector detection unit 27 detects a global vector that is an example of information of a global motion described above along with detection of the local vector.

An operation of the motion vector detection unit 27 will be described in description of a first embodiment in detail later, but the motion vector detection unit 27 performs an image analysis process in units of frame for a captured image signal (luminance signal and color signal) obtained by, for example, the YC generation unit 23, and then obtains motion vectors (local vectors) of each area obtained by dividing a screen into a plural number. In addition, there are cases in which a vector of the entire image (global vector) is obtained from the local vectors.

The motion vector detection unit 27 transfers the local vectors of each area obtained by dividing the screen or the local vectors and global vector of each area to a main subject determination unit 30a of the control unit 30 for the main subject determination process.

Note that a functional configuration in which the motion vector detection unit 27 is implemented in the digital signal processing unit 20 is set in the example of FIG. 3, but this is an example, and an example in which the main subject determination unit 30a of the control unit 30 executes the process of the motion vector detection unit 27 is also considered.

There is a functional configuration in which a candidate detection unit 28 is provided when second and third embodiments to be described later are employed.

A functional configuration in which the candidate detection unit 28 is implemented in the digital signal processing unit 20 is set in the example of FIG. 3, but this is an example, and the main subject determination unit 30a of the control unit 30 may execute the process of the candidate detection unit 28.

The candidate detection unit 28 performs an image analysis process in units of frames (or per intermittent frame) for a captured image signal (luminance signal and color signal) obtained by, for example, the YC generation unit 23, and then extracts a candidate image. In other words, face image detection, human body detection, and the like are performed for image data continuously input on a time axis, and then images serving as candidates for a main subject are extracted.

Note that face detection, human body detection, and the like can be performed using techniques of pattern matching and the like in image analysis performed with respect to captured image data, but if only a dictionary used in pattern matching is replaced, other detectors can also be realized in principle. For example, extraction of candidate images of a main subject for dog face detection (of a certain breed), cat face detection, and the like is possible.

In addition, for example, detecting a moving body and setting the moving body to be a candidate image using a technique of moving body detection based on a frame difference can also be considered, and a technique of extracting an area of interest that is called saliency (Saliency) may be used.

Various techniques of extracting and selecting candidate images are considered.

The candidate detection unit 28, for example, a face image is detected, and an area in which the face image is present is extracted as a candidate image frame.

With regard to the extracted candidate image, position information of the candidate image frame (x and y coordinate values on a screen, information of a subject distance, and the like) or size information (for example, the width, height, and number of pixels of the candidate image frame, and the like) are transferred to a main subject determination unit 30a of the control unit 30 as candidate image information. Note that, here, since the candidate image information is information indicating a frame of an image area serving as a candidate image, the term of candidate image information is also referred to as "candidate image frame information."

In addition, as the candidate image frame information, attribute information of candidate images (types of a face, a human body, a dog, a cat, and the like, individual (entity) identification information, and further image data itself may also be included.

In addition, the candidate detection unit 28 may perform a smoothing process, an outlier (outlier) removal process, or the like for the image to generate candidate image frame information.

The control unit 30 is configured by a micro-computer (arithmetic operation processing device) that has a CPU, a ROM (Read Only Memory), a RAM (Random Access Memory), a flash memory, and the like.

By executing a program stored in the ROM, the flash memory, and the like, the CPU comprehensively controls the entire imaging apparatus 10.

The RAM serving as a work area when the CPU performs various kinds of data processes is used for temporarily storing data, programs, and the like.

The ROM and the flash memory (non-volatile memory) are used for storing an OS (Operating System) necessary for control of each unit by the CPU, content files such as image files, application programs for various operations, firmware, and the like. For example, programs for executing the main subject determination process that will be described later in the present example, and further application programs that use main subject determination results, and the like are stored therein.

The control unit 30 described above controls operations of necessary units relating to instruction of various signal processes in the digital signal processing unit 20, imaging operations and recording operations according to a user manipulation, a reproducing operation of recorded image files, camera operations such as zooming, focusing, and exposure adjustment, user interface operations, and the like.

In addition, in the present embodiment, the control unit 30 has the function of the main subject determination unit 30a, and executes the main subject determination process as will be described later in the first to the third embodiments.

In this case, the main subject determination unit 30a executes the process of main subject determination using the global vector and local vectors transferred from the motion vector detection unit 27 and the sensor unit 14 that will be described later. As will be described in the second and third embodiments, there are cases in which a position state determination process, a stable presence degree computation process, and a main subject setting process based on a degree of stable presence are executed for candidate image information transferred from the candidate detection unit 28, in addition to the process using the global vector and the local vectors.

The user interface 33 executes display output and audio output to a user, and receives input of a user operation. For this reason, the user interface has a display device, an operation device, a speaker device, a microphone device, and the like. Herein, a display unit 34 and a manipulation unit 35 are shown.

The display unit 34 is a display unit that performs various types of display for a user (a photographer and the like), and for example, is formed using a display device, such as an LCD (Liquid Crystal Display) or an organic EL (Electro-Luminescence) display, which is formed on a housing of the imaging apparatus 10. In addition, the display unit may be formed using the LCD or the organic EL display in a so-called view finder form.

This display unit 34 includes the display device and a display driver that allows the display device to perform display. The display driver allows various types of display to be performed on the display device based on the instruction of the control unit 30. For example, the display driver reproduces and displays a still image or a dynamic image captured and recorded in a recording medium, or displays a through image (subject monitoring image) as a dynamic image based on captured image data of each frame, which is captured during release (a shutter manipulation) standby, on a screen of the display device. Furthermore, the display driver allows various operation menus, icons, messages and the like, that is, a GUI (Graphical User Interface), to be displayed on the screen. In the case of the present embodiment, for example, display that helps the user to ascertain a determination result obtained from main subject determination on the through image or reproduced image is also performed.

The manipulation unit 35 has an input function of receiving a user manipulation, and sends a signal corresponding to the input manipulation to the control unit 30.

The manipulation unit 35, for example, is realized by various manipulators provided on the housing of the imaging apparatus 10, a touch panel formed on the display unit 34, and the like.

As the manipulator on the housing, a reproduction menu start button, a decision button, an arrow key, a cancellation button, a zoom key, a slide key, a shutter button (a release button) and the like are provided.

Furthermore, by a touch panel manipulation using the icons and menus displayed on the touch panel and the display unit 34, various kinds of manipulation may be possible.

An operation of the display unit 34 of the user interface 33 and the like is controlled by the UI controller 32 according to instructions of the control unit 30. In addition, information of operations by the manipulation unit 35 is transmitted to the control unit 30 by the UI controller 32.

The recording unit 15 includes, for example, a nonvolatile memory, and serves as a storage area for storing image files (content files) such as still image data or dynamic image data, attribute information of the image files, thumbnail images and the like.

The image files are stored in the form of, for example, a JPEG (Joint Photographic Experts Group), a TIFF (Tagged Image File Format), a GIF (Graphics Interchange Format) and the like.

The actual form of the recording unit 15 can be variously considered. For example, the recording unit 15 may be a flash memory that is embedded in the imaging apparatus 10, or may have a form based on a memory card (for example, a portable flash memory) attachable to and detachable from the imaging apparatus 10 and a card recording and reproduction unit that performs recording and reproduction access to the memory card. Furthermore, the recording unit may be realized in the form of an HDD (Hard Disk Drive) and the like that is embedded in the imaging apparatus 10.

Furthermore, in the present example, a program for performing a stable imaging state presumption process and the main subject determination process that will be described later may be stored in the recording unit 15.

The communication unit 16 performs data communication or network communication with an external device in a wired or wireless manner.

For example, the communication unit performs communication of the captured image data (still image files or dynamic image files) with an external display apparatus, a recording apparatus, a reproduction apparatus and the like.

Furthermore, as a network communication unit, the communication unit may perform communication through various networks, for example, the Internet, a home network, or a LAN (Local Area Network), or perform various types of data transmission and reception with a server, a terminal and the like on the network.

The sensor unit 14 comprehensively represents various sensors. For example, a gyro sensor (angular velocity sensor), an acceleration sensor, and the like for detecting overall motions of the imaging apparatus 10 such as camera shake, attitudes and movements (panning movement, tilting movement, and the like) of the imaging apparatus 10 are provided.

In addition, a luminance sensor that detects external luminance for exposure adjustment and the like and a distance measuring sensor that measures subject distances may be provided.

In addition, there are cases in which a zoom lens position sensor that detects positions of the zoom lens in the optical system 11 and a focus lens position sensor that detects positions of the focus lens are provided as the sensor unit 14.

In addition, there are cases in which a sensor that detects opening amounts of a mechanical iris (diaphragm mechanism) is provided as the sensor unit 14.

The various sensors of the sensor unit 14 each transmit detected information to the control unit 30. The control unit 30 can perform various kinds of control using the information detected by the sensor unit 14.

The constituent elements of the image processing device 1 as described in FIG. 1 are configured in the imaging apparatus 10 as follows.

The configuration equivalent to the main subject determination unit 2 of the image processing device 1 of FIG. 1 is implemented by software as the main subject determination unit 30a of the control unit 30 in the imaging apparatus 10. The control unit 30 performs an operation as the image processing method mentioned in the claims by executing a process based on the program mentioned in the claims.

The configuration equivalent to the local motion detection unit 3 of FIG. 1 corresponds to the motion vector detection unit 27. The motion vector detection unit 27 detects local vectors with respect to each area obtained by dividing a screen, and then supplies the vectors to the main subject determination unit 30a.

The configuration equivalent to the global motion detection unit 4 of FIG. 1 also corresponds to the motion vector detection unit 27.

The motion vector detection unit 27 can obtain a global vector through an arithmetic operation using local vectors after the local vectors with respect to each area obtained by dividing the screen are detected. In this case, the motion vector detection unit 27, i.e., the configuration of the local motion detection unit 3 and the global motion detection unit 4, can be realized by a configuration in which the motion vector detection unit 27 detects local vectors of each area in an image through an image analysis process and a global vector is detected using the local vectors of each area.

The configuration equivalent to the global motion detection unit 4, however, can also correspond to the sensor unit 14.

Information of a global motion indicating a motion of an entire image can also be obtained as a change of an imaging direction of the imaging apparatus 10. This is because an overall motion of a captured image is expressed by a change of an imaging direction. Thus, the value of a global vector as the information of the overall motion of the captured image can be obtained from detection values of the angular velocity sensor and the acceleration sensor in the sensor unit 14, i.e., information of the motion of the imaging apparatus 10 itself.

For example, the main subject determination unit 30a of the control unit 1 can take the detection value of the angular velocity sensor as a value of a global vector by integrating the detection value with time. Alternatively, the detection value of the acceleration sensor can be taken as a value of a global vector by integrating the detection value with time twice.

In this case, the configuration equivalent to the local motion detection unit 3 corresponds to the motion vector detection unit 27, and the configuration equivalent to the global motion detection unit 4 corresponds to the sensor unit 14.

In the first to the third embodiments that will be described below, any configuration described above may be used as the configuration equivalent to the global motion detection unit 4.

3. Opportunity and Objective of Main Subject Determination, Etc.

In the present embodiment, main subject determination is performed as described in the first to the third embodiments to be described later, and an opportunity, objective, etc. for performing main subject determination in the imaging apparatus 10 will be described.

First, an example of using a main subject determination result will be described.

Main subject determination is executed when, for example, a user (photographer) aims at a shutter timing (release timing), but the control unit 30 can perform the following process after a main subject is automatically determined.

Tracking Process

A main subject set in each captured frame is tracked. For example, a main subject is specified on a through image display for the user, and provided for adjusting an angle of view performed by the user (for example, for decision of a subject in a state in which a camera is held in a hand).

Note that, as presentation of a main subject, highlight display of the frame of the main subject on the through image display by the display unit 34 is considered. In addition, the highlight display or the like may be performed for a given period immediately after the determination, or may be performed as long as the main subject is present within the through image.

Focusing

Auto focus is controlled for a main subject. In addition, in accordance with the tracking process, focus is adjusted tracking the main subject even when the main subject moves around.

Exposure Adjustment

Automatic exposure adjustment is performed based on brightness (luminance) of a main subject.

Directivity Adjustment

When sound collection is performed using a microphone together with capturing (for example, dynamic image capturing), directivity adjustment is performed according to a direction of a main subject within a field of view.

Zoom Control

Auto zoom is controlled with respect to a main subject. For example, the zoom lens is automatically driven so that the main subject is projected in a captured image in a predetermined size or greater at all times. Together with the tracking process, an angle of view may be set to be adjusted using zoom according to a change in a distance to the main subject.

Recording Start Control

Main subject determination may be set to trigger a start of dynamic image capturing. For example, dynamic image capturing and recording are started according to decision of a main subject.

In addition, a main subject can also be used in various signal processes performed with respect to a captured image signal.

Image Effect Process

Image processes including image quality adjustment, noise reduction, skin color adjustment, and the like are performed only on the area of a main subject in each captured frame.

Alternatively, adding an image effect, for example, a mosaicing process, an airbrushing process, a paint-out process, or the like in an area other than the area of the main subject is also considered.

Image Editing Process

An editing process such as framing, cropping, or the like is performed on a captured image or a recorded image.

For example, a process of cropping, enlarging, or the like of a partial area within a frame in which a main subject is included can be performed.

In addition, cutting of image peripheral portions of captured image data or the like can be performed so that a main subject is disposed at the center of the image, and composition adjustment can be performed.

These are merely examples, and various processes of application programs or automatic adjustment functions included in the imaging apparatus to use a set main subject are considered in addition to them.

Next, at what point of time the main subject determination process should be executed is also variously considered.

For example, whenever the imaging apparatus 10 is turned on to perform imaging (a period in which the display unit 34 displays a through image), the main subject determination process may be performed.

In addition, when a main subject is determined and then the tracking process is performed, the main subject determination process may be performed again at the time when the tracking is lost.

In addition, the main subject determination process may be set to start through user manipulation.

In addition, the process may be executed whenever a user selects a determination execution mode, or tracking is lost.

In addition, automatically activating the main subject determination process regardless of user manipulation may also be considered.

The following effects are achieved by performing the main subject determination process.

As previously described, it is naturally difficult to perform an operation of designating a main subject when a photographer aims at the subject holding the imaging apparatus 10.

Particularly, when an imaging direction is continuously changed in a fixed direction as in panning and tilting, or when an imaging direction is changed not in a fixed direction, the manipulation of designating a main subject is particularly difficult.

In addition, the action of designating subjects many times is bothersome.

If main subject determination is set to be automatically performed, such troubles are overcome, and the effect of reduced stress on the user is obtained.

In addition, the imaging apparatus 10 that is carried and used by a user, such as a digital still camera, a camera included in a mobile telephone, or the like used by general users, has the display unit 34 of a small size, and thus it is difficult for the user to perform an accurate manipulation of designating a main subject on a screen. The problem of erroneous designation is resolved by performing automatic determination as described in the present embodiment.

In addition, if the imaging apparatus 10 is set to automatically perform main subject determination, a user executes the main subject determination in a situation in which he or she holds the imaging apparatus 10 to aim at a subject, or changes an imaging direction to track the subject, and thus effects of enhancement of a feeling of intelligence of the apparatus that the user senses from the apparatus and enhancement of added value are obtained.

In addition, since the user can use the imaging apparatus 10 with a feeling of being able to image a main figure only by naturally holding the apparatus, imaging opportunities and use cases associated therewith can increase, and accordingly, a user-friendly camera can be provided to the user.

Based on the above points, as a camera of hand-held type, the imaging apparatus 10 of the present embodiment that automatically performs main subject determination is particularly preferred.

4. First Embodiment

A main subject determination process will be described as a first embodiment.

The first embodiment is a process in which the control unit 30 (main subject determination unit 30a) compares each of areas obtained by dividing a screen, local vectors, and a global vector, and then determines a main subject based on a detection result of an area among the areas, of which a local vector is determined to be dissimilar to a global vector.

First, a functional configuration of the main subject determination unit 30a according to the first embodiment will be described in FIG. 4.

Figure 4:
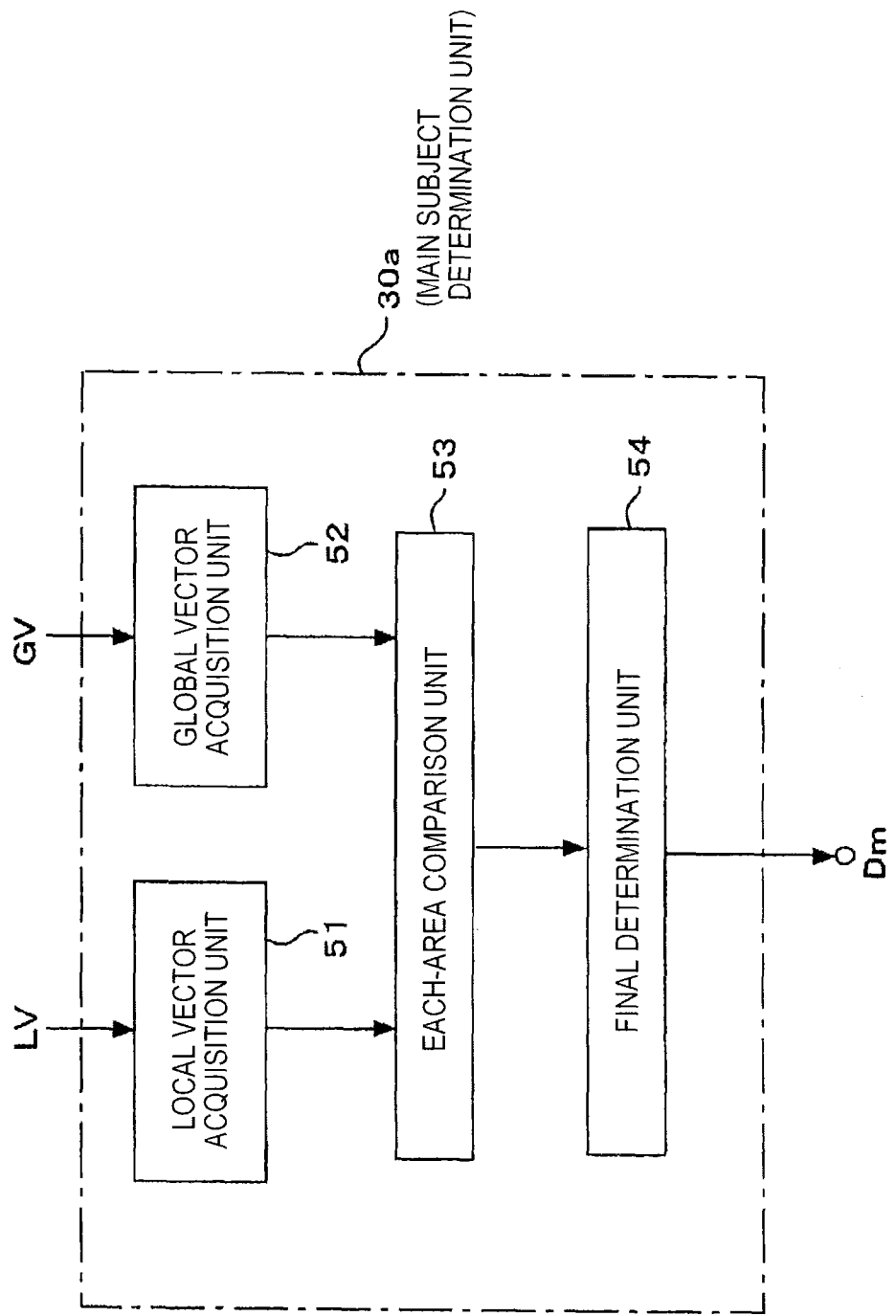
FIG. 4 is a block diagram of a functional configuration of a main subject determination unit of a first embodiment.
Figure 5:
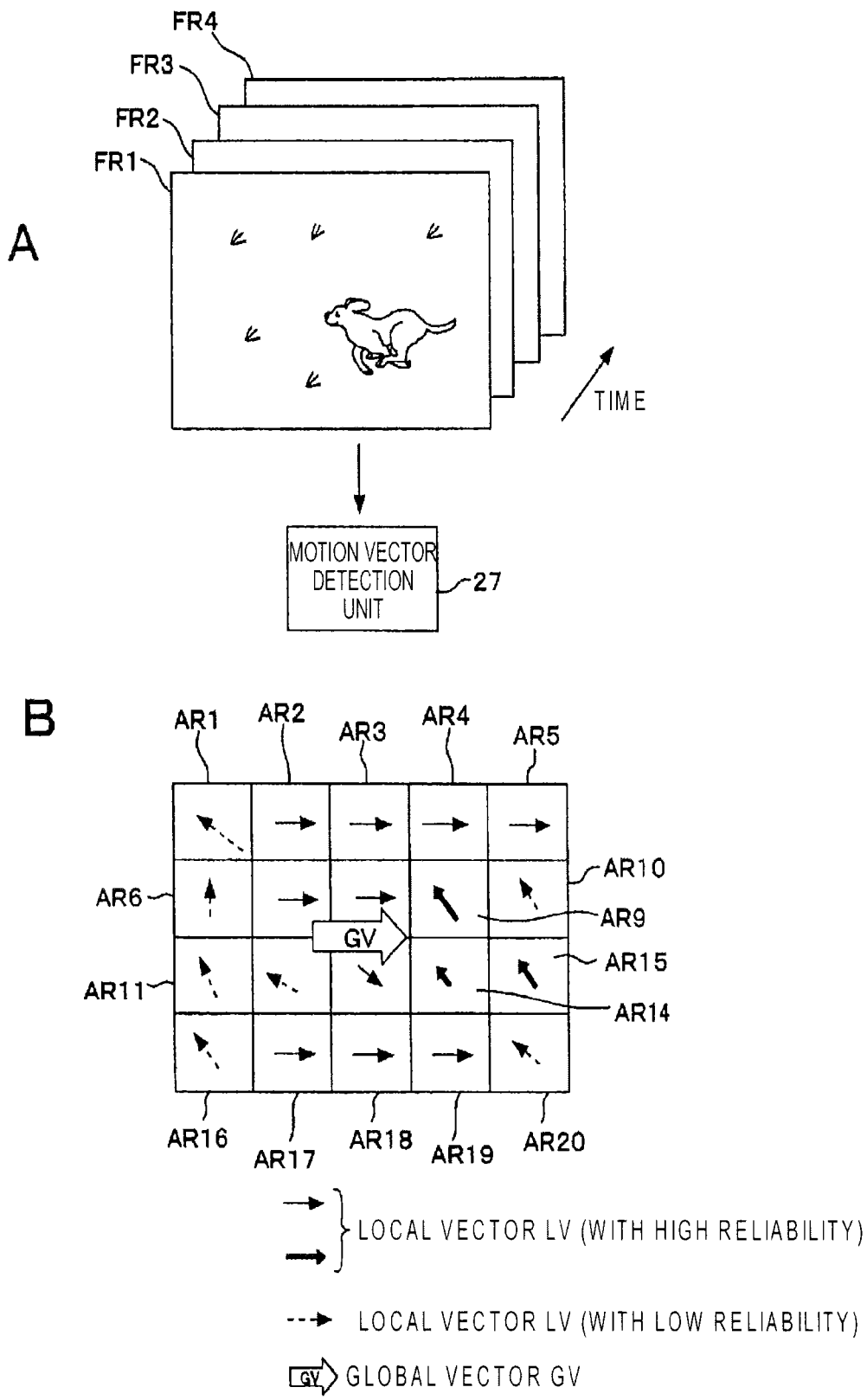
FIG. 5 is an illustrative diagram of motion vector detection of an embodiment.

The main subject determination unit 30a includes, for example, a local vector acquisition unit 51, a global vector acquisition unit 52, an each-area comparison unit 53, and a final determination unit 54 as shown in FIG. 4 as a functional configuration of software.

The local vector acquisition unit 51 acquires local vectors LV of each of areas obtained by dividing a screen from the motion vector detection unit 27.

The global vector acquisition unit 52 acquires a global vector GV that is information of a motion of an entire screen from the motion vector detection unit 27 or the sensor unit 14.

Note that, in the configuration in which an angular velocity detection value and an acceleration detection value from the sensor unit 14 are acquired as the global vectors GV, the global vector acquisition unit 52 may perform a conversion process on the detection values into a level of pixels so as to match the local vectors LV.

In other words, when the angular velocity detection value is used, angle information is obtained by integrating the value with time, and when the acceleration detection value is used, angle information is obtained by integrating the value with time twice, however, the angles may be taken as values of the global vectors GV by converting the angles into the equivalent number of pixels. Of course, the global vectors GV may be supplied to the control unit 30 (main subject determination unit 30a) by providing the function of performing the conversion process as above in the sensor unit 14 to perform the conversion.

The each-area comparison unit 53 performs a process of comparing the local vectors LV of each of the areas taken by the local vector acquisition unit 51 to the global vectors GV taken by the global vector acquisition unit 52.

The final determination unit 54 performs main subject determination using the determination result of the each-area comparison unit 53 and then outputs main subject information Dm.

An overview of the main subject determination operation executed by the main subject determination unit 30a and the motion vector detection unit 27 (or the sensor unit 14 in addition to that) of the functional configuration described above will be described in FIGS. 5 to 8.

FIG. 5A shows that the motion vector detection unit 27 detects motion vectors targeting captured image data of each of frames FR1, FR2, FR3, . . . sequentially obtained on a time axis.

The motion vector detection unit 27 divides a screen of one frame into a plurality of areas as shown in FIG. 5B, and performs a process of detecting motions of a subject image (time difference) in a period in which the frame is transitioned as vectors for each area.

FIG. 5B shows an example in which a screen is divided into 20 areas including areas AR1 to AR20. Dividing a screen into 20 areas is a mere example, and the following description will be provided with regard to this example.

The vectors detected in each of the areas AR1 to AR20 are local vectors LV, and each of the local vectors LV is indicated by a solid line, a thick line, or a dashed line.

As the local vectors LV, however, there are vectors with high reliability and low reliability to be used for main subject determination.

For example, a vector of an area in which an image has a high contrast has high reliability. This is because, for example, an area in which a subject that is a target of main subject determination such as a person, an animal, or a moving body is present has a relatively high contrast.

On the other hand, a vector of an area in which an image has a low contrast has low reliability. This is because, for example, an area in which a subject is present as a background has a relatively low contrast.

In FIG. 5B, the local vectors LV of an area with high reliability are indicated by solid lines and thick lines, and the local vectors LV of an area with low reliability are indicated by dashed lines.

The motion vector detection unit 27 supplies information of the local vectors LV of the areas to the control unit 30 (main subject determination unit 30a). Note that, in this case, information representing high reliability or low reliability is also added to each of the local vectors LV.

On the other hand, the global vector GV is a motion of an entire screen. In other words, it can be said to be information of a comprehensive motion of entire subject images appearing in captured image data. In FIG. 5B, the global vector GV is shown at the center.

When the motion vector detection unit 27 obtains the global vector GV, the global vector GV can be obtained as the average of the local vectors LV having high reliability indicated by the solid lines or thick lines, or the like. In addition, using the technique of affine transformation or the like, the global vector GV can also be obtained through an arithmetic operation that also considers a rotation component of each of the local vectors LV.

When a detection value of angular velocity or acceleration from the sensor unit 14 is used, by converting angle information obtained from such a detection value into a level of pixels, information of the global vector GV as shown in the drawing is obtained.

The information of the global vector GV is supplied to the control unit 30 (main subject determination unit 30a) from the motion vector detection unit 27 or the sensor unit 14.

Note that, FIG. 5B shows an example of a situation in which a user moves an imaging direction of the imaging apparatus 10 in, for example, the left direction when viewed by the user (performs panning). Thus, as a motion expressed in an image, a motion from the left to the right is observed as a whole when the image is faced. In many areas, local vectors RV directing the right side as indicated by the solid-lined arrows are obtained.

By computing the global vector GV mainly using the local vectors RV directing the right side, the global vector GV, which is an overall motion of the image, also moves to the right side as shown in the drawing.

The global vector GV is, however, described as being obtained also as information from the sensor unit 14, but if the imaging apparatus 10 pans to, for example, the left side, the motion of the entire image moves in the right direction. Thus, when a detection value from the angular velocity sensor or acceleration sensor is used, it is necessary for directivity of the global vector GV to be defined by converting the motion of the imaging apparatus 10 into a motion expressed in the entire image for matching with the local vectors RV.

The local vector acquisition unit 51 and the global vector acquisition unit 52 shown in FIG. 4 are constituent elements of the main subject determination unit 30a that acquire the local vectors LV (and reliability information) obtained as above with respect to each of the areas AR1 to AT20 and the global vector GV as information of a comprehensive motion of an entire image.

For example, when the motion vector detection unit 27 detects and outputs the local vectors LV of the areas AR1 to AT20 at a timing of one frame, the local vector acquisition unit 51 acquires the local vectors LV of the areas AR1 to AT20 at a timing of one frame.

In addition, the global vector acquisition unit 52 acquires the global vector GV from the motion vector detection unit 27 or the sensor unit 14 for each frame.

Note that detection of the local vectors LV and the global vector GV may be performed at a timing of intermittent frames, not necessarily a timing of one frame.

The each-area comparison unit 53 of the main subject determination unit 30a performs a comparison process on the acquired local vectors LV of the areas AR1 to AR20 and the global vector GV, and performs a process of a vector dissimilarity flag F(n) shown in FIG. 6A and a process of a time stability degree determination flag J(n) shown in FIG. 6B.

The vector dissimilarity flag F(n) of FIG. 6A ("n" is the number of an area AR(n); in this case, n for the division into the areas AR1 to AR20 includes 1 to 20) is a flag indicating a comparison result of the local vectors LV and the global vector GV with regard to each of the areas AR1 to AR20 obtained by dividing a screen.

Here, when a local vector LV is similar to the global vector GV, or when reliability of a local vector LV is low, the vector dissimilarity flag F(n)=L is set.

On the other hand, when a local vector LV is determined to have high reliability and determined to be dissimilar to the global vector GV, the vector dissimilarity flag F(n)=H is set.

The time stability degree determination flag J(n) (n is 1 to 20 as in F(n) described above) of FIG. 6B is a flag indicating a time stability degree determination result of each of the areas AR1 to AR20 obtained by dividing a screen. A time stability degree is a flag indicating whether or not the condition that a local vector RV be dissimilar to the global vector GV is continuously, cumulatively, or averagely satisfied.

For example, when the above-described vector dissimilarity flag F(n)=H, in other words, when a state of the local vector determined to be dissimilar continues for a predetermined period of time, the time stability degree determination flag J(n)=H.

At the time when the vector dissimilarity flag F(n)=L, or duration of the vector dissimilarity flag F(n)=H does not reach a predetermined period of time, the time stability degree determination flag J(n) corresponding to the area AR(n)=L is set.

Note that, when the time stability degree determination flag J(n) continuously satisfies the condition (vector dissimilarity flag F(n)=H) for the predetermined period of time, the flag is set to be "H," but when the time in which the vector dissimilarity flag F(n)=H is satisfied reaches the predetermined period of time cumulatively or averagely in a unit time, the time stability degree determination flag J(n)=H may be set. In other words, the condition that does not require continuity may be set.

Changes of the vector dissimilarity flag F(n) and the time stability degree determination flag J(n) will be described in FIGS. 7 and 8.

Figure 7:
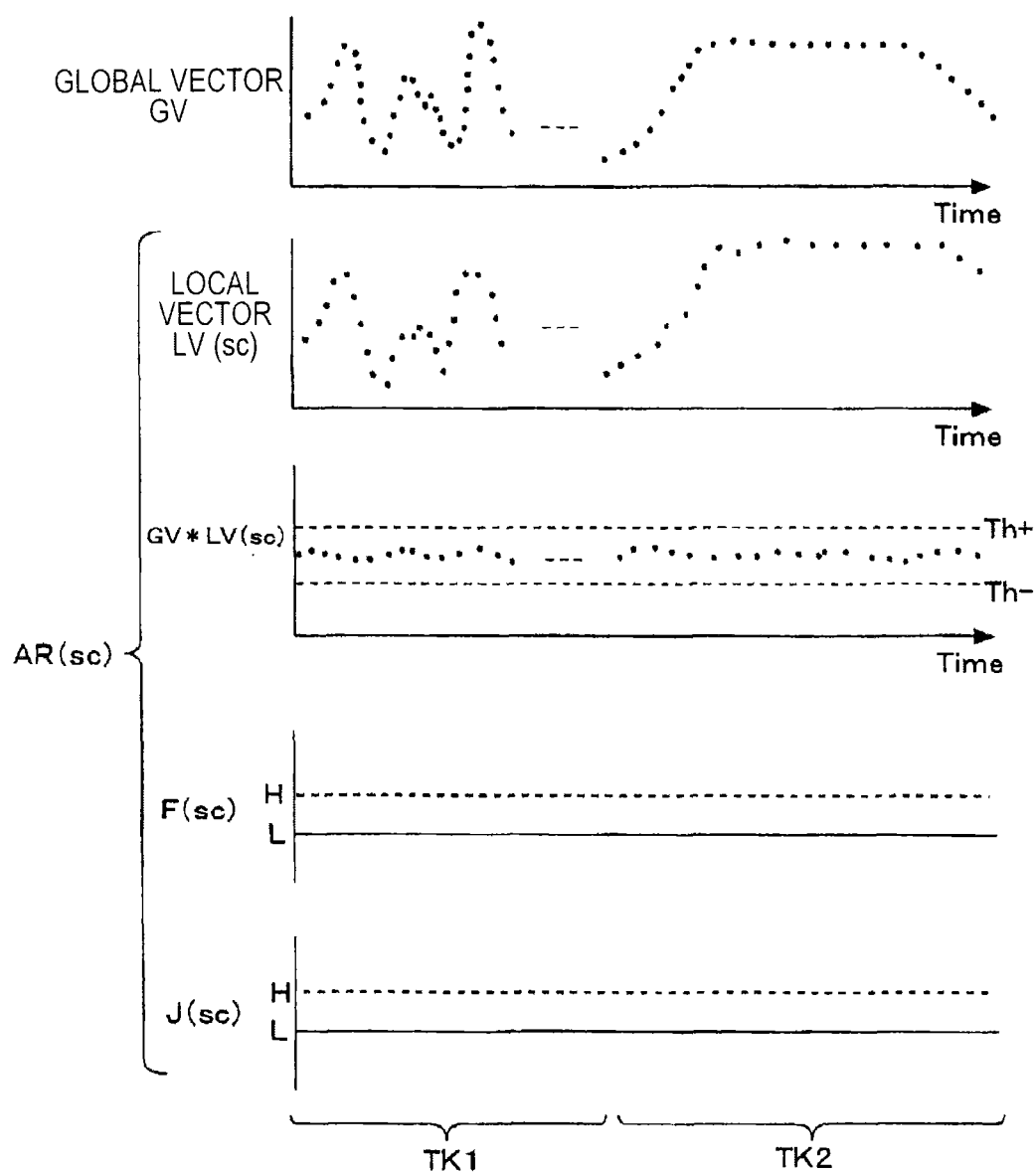
FIG. 7 is an illustrative diagram of a main subject determination operation of an embodiment.

FIG. 7 shows a comparison process performed by the each-area comparison unit 53 for an area AR(sc) of which a local vector LV is determined to be dissimilar to the global vector GV. The area AR(sc) is, for example, the area AR2, AR3, AR4, AR5, or the like in which the local vectors LV are indicated by the solid lines in FIG. 5B.

Figure 8:
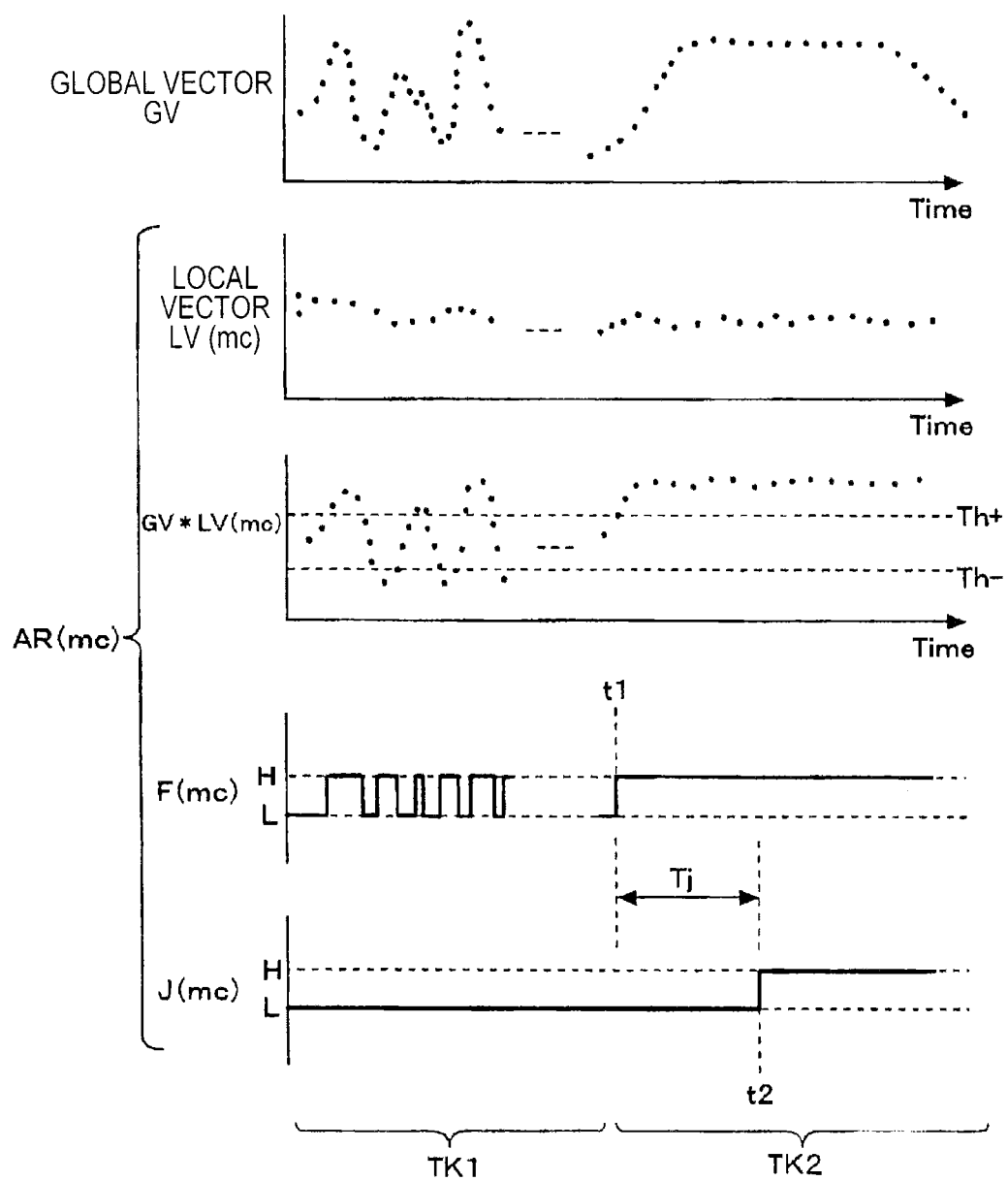
FIG. 8 is an illustrative diagram of another main subject determination operation of an embodiment.

FIG. 8 shows a comparison process performed by the each-area comparison unit 53 for an area AR(mc) of which a local vector LV is determined to be dissimilar to the global vector GV. The area AR(mc) is, for example, the area AR9, AR14, or the like in which the local vectors LV are indicated by the thick lines in FIG. 5B.

In FIGS. 7 and 8, displacement of the global vector GV is indicated by dotted lines. Each point indicates a value of the global vector GV taken by the global vector acquisition unit 52 at each time point (for example, at each frame timing) and supplied to the each-area comparison unit 53. Note that, although the value of the global vector GV is one-dimensionally shown as a level on the vertical axis for the sake of illustration, it actually indicates the direction and quantity (scalar) of a vector.

FIG. 7 shows the local vector LV(sc) of the area AR(sc) such as the area AR2 or the like that is resultantly determined to be similar to the global vector GV. Each point schematically indicates the value (direction and quantity of a vector) of the local vector LV(sc) at each time point.

In addition, the difference between the global vector GV and the local vector LV(sc)(GV*LV(sc)) is shown.

Each point is the value of the difference. Both the global vector GV and the local vector LV(sc), however, have values of directions and quantities of the vectors. Here, the difference between the vectors may be set to be the value of the inner product of the global vector GV and the local vector LV(sc). Herein, "*" of GV*LV(sc) is set to mean an inner product operation. The value of the inner product can also be said to be a value indicating the degree of contribution of a local vector LV to directivity of the global vector GV.

The difference (GV*LV(sc)) in FIG. 7 is the comparison result of the global vector GV and the local vector LV(sc) with regard to a certain area AR(sc). A degree of similarity is determined according to whether or not the difference (GV−LV(sc)) is in the range of a threshold value Th+ and Th−.

In the case of FIG. 7, the difference (GV*LV(sc)) is in the range of the threshold value Th+ and Th− at all times. In this case, at each frame timing, the local vector LV(sc) of the area AR(sc) is assumed to be similar to the global vector GV, and thus the vector dissimilarity flag F(sc)=L.

In addition, the time stability degree determination flag J(n) is set to be a flag having the value of "H" based on the duration of the vector dissimilarity flag F(n)=H. In this case, since the vector dissimilarity flag F(sc)=L continues as shown in FIG. 7, the time stability degree determination flag J(sc)=L is maintained, rather than having the value of "H."

Next, FIG. 8 will be discussed.

FIG. 8 shows the local vector LV(mc) of the area AR(mc) such as the area AR9 or the like that is resultantly determined to be dissimilar to the global vector GV. Each point schematically indicates the value (direction and quantity of a vector) of the local vector LV(mc) at each time point.

In addition, the difference between the global vector GV and the local vector LV(mc) is shown. Each point is the difference (GV*LV(mc)) that is the value of the inner product of the global vector GV and the local vector LV(mc).

The difference (GV*LV(mc)) in FIG. 8 is the comparison result of the global vector GV and the local vector LV(mc) with regard to a certain area AR(mc). A degree of similarity is also determined according to whether or not the difference (GV−LV(mc)) is in the range of the threshold value Th+ and Th− in the same manner as in the case of FIG. 7.

In the case of FIG. 8, the value of the difference (GV*LV(mc)) frequently exceeds the range of the threshold value Th+ and Th−. Furthermore, from the time point t1 and thereafter, the value of the difference (GV*LV(mc)) continuously exceeds the range of the threshold value Th+ and Th−.

At the timing at which the value of the difference (GV*LV(mc)) exceeds the range of the threshold value Th+ and Th−, the vector dissimilarity flag F(mc)=H is set.

In addition, the time stability degree determination flag J(n) is set to be a flag having the value of "H" based on the duration of the vector dissimilarity flag F(n)=H as described above. In this case, at the time point t1 and thereafter in FIG. 8, the vector dissimilarity flag F(n)=H is continuously set, and a predetermined period of time Tj is assumed to elapse in this state at a time point t2. Then, the time stability degree determination flag J(sc)=H is set.

Here, the global vector GV of FIGS. 7 and 8 is focused. In a period TK1 indicating the first half in FIGS. 7 and 8, the global vector GV greatly fluctuates. This is presumed to be a situation in which a photographer changes an imaging direction of the imaging apparatus 10 in various directions in order to, for example, capture a subject that is moving around quickly.

On the other hand, a period TH2 of the second half is presumed to be a situation in which the imaging apparatus 10 is panned to track a subject.

As shown in FIG. 7, the fact that the local vector LV(sc) is similar to the global vector GV means that a change in an image appearing in the area AR(sc) is substantially the same as the change of the imaging direction. Taking a relative motion of an image with respect to the imaging apparatus 10 itself into consideration, the area AR(sc) is assumed to have a large amount of motions of the image.

A situation in which, for example, an image of a background that is not tracked by the user is projected in the area AR(sc) is assumed. Even though the background subject stands still, the imaging direction of the imaging apparatus 10 changes, and thus the change of the background image appearing in the area AR(sc) is significant, and similarity to the global vector GV is determined.

In both periods TK1 and TK2 shown in FIG. 7, the local vector LV(sc) is similar to the global vector GV. This indicates that the background image appearing in the area AR(sc) changes according to the change of the imaging direction of the imaging apparatus 10. In other words, it can be presumed that the image appearing in the area AR(sc) is not the image that the user intends.

With respect to the area AR(sc) as above, the difference between the global vector GV and the local vector LV(sc) (GV*LV(sc)) is small.

Thus, the image appearing in the area AR(sc) in which the difference (GV*LV(sc)) is small and the vector dissimilarity flag F(n)=L is set as shown in FIG. 7 can be determined not to be an image eligible as a main subject.

On the other hand, as shown in FIG. 8, the fact that the local vector LV(mc) is dissimilar to the global vector GV indicates that the image appearing in the area AR(mc) has little motion in the image even though there is a change in the imaging direction. Taking a relative motion of the image to the imaging apparatus 10 itself into consideration, the area AR(mc) is assumed to have a small amount of motions of the image.

A situation in which, for example, an image the user tracks for the purpose of imaging is projected in the area AR(mc) is assumed. This is a situation in which the user changes the imaging direction so as to capture the subject moving around as close to the center of the image as possible. Even though the change of the imaging direction is significant, the user keeps tracking the subject that he or she intends, and thus the target subject image is continuously captured in a vicinity of a certain area on the screen.

For that reason, the local vector LV(mc) is dissimilar to the global vector GV in both of the periods TK1 and TK2 shown in FIG. 8, and thus has a relatively small value.

In the period TK1, however, the difference between the global vector GV and the local vector LV(mc) (GV*LV(mc)) in the area AR(mc) changes considerably. Based on this, a situation in which the user is not able to capture the target subject in his or her intended position within the screen is presumed.

After the period, at the time point t1 and thereafter, the user performs panning, and the value of the local vector LV(mc) is small even though the value of the global vector GV is great, and thus the difference (GV*LV(mc)) is stabilized in the state of exceeding the threshold value Th+.

Based on this, a situation in which the user performs panning using the imaging apparatus 10 while capturing the target subject is presumed. In other words, the image appearing in the area AR(mc) can be presumed to be the image that the user intends.

In other words, when the difference (GV*LV(sc)) is stabilized exceeding the range of the threshold value Th+ and Th− as shown in FIG. 8, the image appearing in the area AR(mc) can be determined as a main subject image. Based on this, it can be detected that the time in which the vector dissimilarity flag F(n)=H continues for a predetermined period of time Tj and the time stability degree determination flag J(n)=H.

In FIG. 6B, for example. The areas AR9 and AR14 have the time stability degree determination flag J(n)=H. Based on this, the subject images included in the areas AR9 and AR14 are presumed to be main subjects.

Note that the time stability degree determination flag J(n)=H is set when the time in which the vector dissimilarity flag F(n)=H continues for the predetermined period of time Tj here, but the time stability degree determination flag J(n)=H may be set when the time in which the vector dissimilarity flag F(n)=H cumulatively reaches the predetermined period of time Tj.

Alternatively, the time stability degree determination flag J(n)=H may be set when the time in which the vector dissimilarity flag F(n)=H averagely reaches the predetermined period of time in a unit time.

The each-area comparison unit 53 shown in FIG. 4 performs the process of the vector dissimilarity flag F(n) and the time stability degree determination flag J(n) by performing the processes described in FIGS. 7 and 8 above.

Then, the final determination unit 54 finally performs main subject determination using the results of the flag processes.

Figure 9:
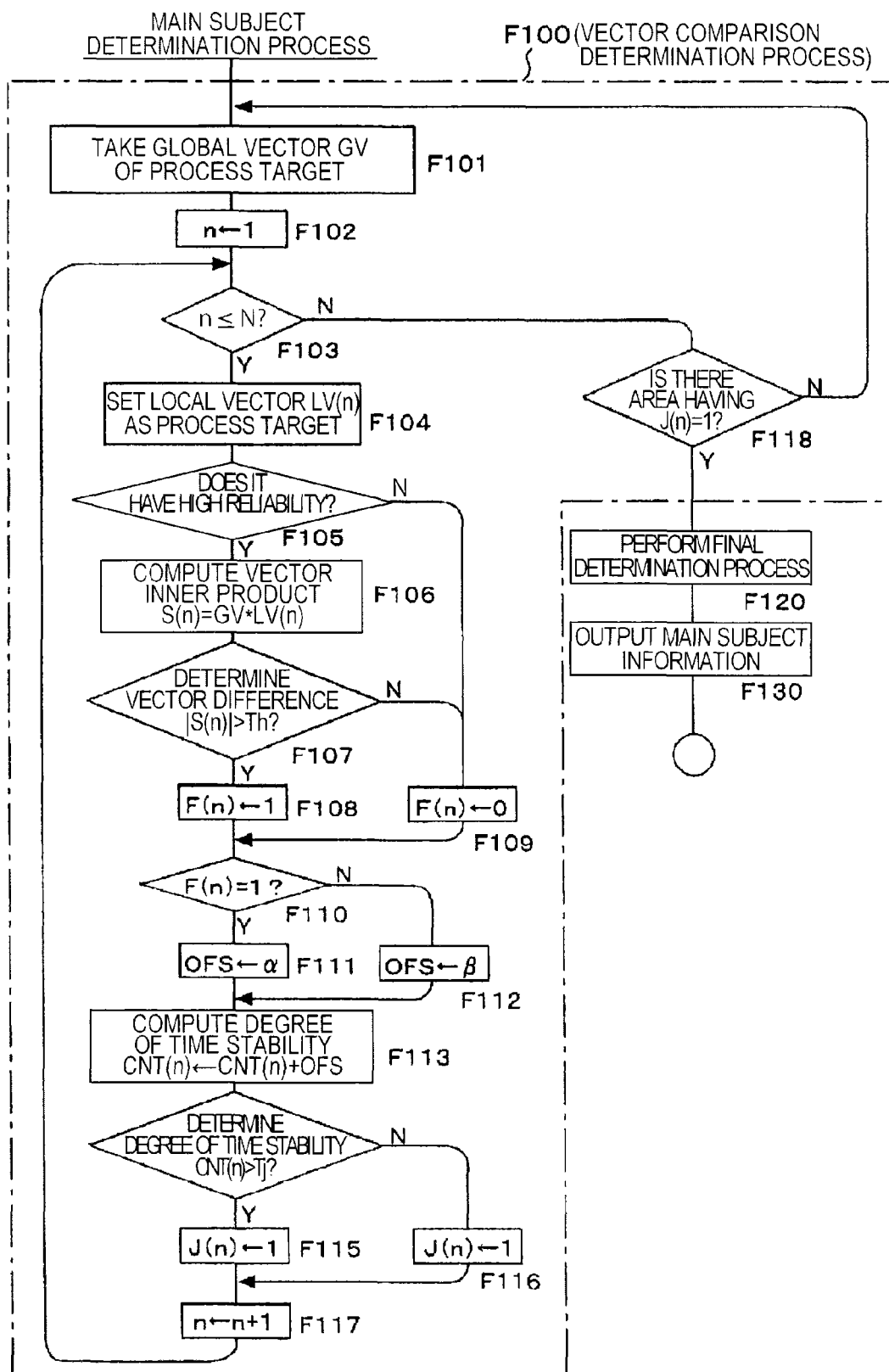
FIG. 9 is a flowchart of a main subject determination process of the first embodiment.

FIG. 9 describes a specific example of the main subject determination process executed by the control unit 30 (main subject determination unit 30a).

Steps F101 to F130 of FIG. 9 show the process executed by the control unit 30 as the function of the main subject determination unit 30a.

Note that Step F100 surrounded by the dashed-dotted line (F101 to F118) may be considered as a vector comparison determination process executed by the each-area comparison unit 53 of FIG. 4 after receiving the supply of the local vectors LV and the global vector GV from the local vector acquisition unit 51 and the global vector acquisition unit 52. In addition, Steps F120 and F130 may be considered as processes of the final determination unit 54 of FIG. 4.

As a consistent premise of description, the control unit 30 (including the local vector acquisition unit 51 and the global vector acquisition unit 52 of FIG. 4) is assumed to take the local vectors LV(n) of each of the areas AR1 to AR20 and the global vector GV at each frame timing.

In addition, the variable n is assumed to be an area number of each of the areas AR1 to AR20 obtained by dividing an image like the "n" described above. With respect to the example in which the screen is divided into 20 areas including the areas AR1 to AR20, n is a value of 1 to 20. N is the maximum value of n, and thus N=20 in this example.

As the main subject determination process of FIG. 9, the control unit 30 first takes the global vector GV as a process target in Step F101. To be specific, it is a process of taking the global vector GV taken by the global vector acquisition unit 52 at a certain frame time point as a process target by the each-area comparison unit 53.

Next, the control unit 30 proceeds to Step F103 and succeeding steps with the variable n=1 set in Step F102.

The control unit 30 proceeds to Step F104 from F103 to have a local vector LV(n) as a process target at the time at which the variable n does not reach the maximum value N. In other words, among the local vectors LV1 to LV20 of each of the areas AR1 to AR20 taken by the local vector acquisition unit 51, the local vector LV(n)=LV1 is set as a process target of the each-area comparison unit 53 at a current frame timing.

The control unit 30 checks information of reliability added to the information of the local vector LV(n) that is set as a process target in Step F105. When the local vector LV(n) has high reliability, the process proceeds to Step F106. On the other hand, when the local vector LV(n) has low reliability, the process proceeds to Step F109.

When the local vector LV(n) has high reliability, the control unit 30 computes an inner product S(n)=GV*LV(n) as the difference between the local vector LV and the global vector GV of the area AR(n) in Step F106. "*" indicates an arithmetic operation of the vector inner product.

Thus, at the time point of n=1, first, the arithmetic operation of the inner product S1=GV*LV1 is performed for the area AR1.

As described in FIGS. 7 and 8, the inner product corresponds to the difference between a local vector LV and a global vector GV.

The control unit 30 makes a determination on |S(n)|>Th in Step F107. In other words, it is determined whether or not the value of the inner product (the value corresponding to the vector difference indicating the similarity degree of a vector) is within a predetermined range.

"Th" indicates the threshold value Th+ or Th− shown in FIGS. 7 and 8. In this case, the threshold values Th+ and Th− are set to have the same absolute value regardless of whether they are above or below 0.

Thus, the determination of |S(n)|>Th is a process of determining whether or not the inner product S(n) exceeds the range of the threshold value Th+ and the threshold value Th−. In other words, it is determined whether or not the local vector LV(n) that is a process target is dissimilar to the global vector GV.

If |S(n)|>Th is satisfied, the control unit 30 proceeds to Step F108, and the vector dissimilarity flag F(n)=1 (="H") is set.

If |S(n)|>Th is not satisfied, the control unit 30 proceeds to Step F109, and the vector dissimilarity flag F(n)=0 (="L") is set.

Note that, also when the local vector LV(n) is determined to have low reliability in Step F105 described above, the process proceeds to Step F109, and the vector dissimilarity flag F(n)=0 (="L") is set.

In this process, for example, at the time point of n=1, the process of the vector dissimilarity flag F1 is performed for the area AR1.

In other words, when the local vector LV1 is similar to the global vector GV, or the local vector LV1 has low reliability, the vector dissimilarity flag F1=0 is set.

On the other hand, when the local vector LV1 is determined to have high reliability and to be dissimilar to the global vector GV, the vector dissimilarity flag F1=1 is set.

Next, the control unit 30 sets a count offset value OFS in Step F110 according to the vector dissimilarity flag F(n), for example, whether the vector dissimilarity flag F1 of the area AR1 is "1" or "0."

For example, the control unit 30 sets the count offset value OFS=α in Step F111 when the vector dissimilarity flag F(n)=1. α is a predetermined value for increasing a counter. For example, α=1 is set.

In addition, the control unit 30 sets the count offset value OFS=β in Step F112 when the vector dissimilarity flag F(n)=0. β is a predetermined value for keeping a count value or decreasing a count value. When the count value is kept, β=0 is set. When the counter decreases, for example, β=−1 is set.

Then, in Step F113, the control unit 30 computes a degree of time stability. To be specific, a counting process of a counter CNT(n) indicating the time stability degree is performed with CNT(n)=CNT(n)+OFS.

When α=1 and β=0 are set in Steps F111 and F112 described above and the offset value OFS is set, if the vector dissimilarity flag F(n)=1 is set, the value of the counter CNT(n) increases. When the vector dissimilarity flag jF(n)=0, the value of the CNT(n) is kept.

In addition, when α=1 and β=−1 are set in Steps F111 and F112 described above and the offset value OFS is set, if the vector dissimilarity flag F(n)=1 is set, the value of the counter CNT(n) increases, and if the vector dissimilarity flag F(n)=0 is set, the value of the counter CNT(n) decreases.

Then, the control unit 30 determines whether or not the value of the counter CNT(n) exceeds the predetermined period of time Tj in Step F114, and if the value exceeds the time, the time stability degree determination flag J(n)=1 is set in Step F115. In addition, if the value does not exceed the time, the time stability degree determination flag J(n)=0 is set in Step F116.

Then, the variable n increases in Step F117, and then the process returns to Step F103.

Until this point, with the variable n=1, the local vector LV1 and the global vector GV are compared to each other with respect to the area AR1, and based on the result, the process of the vector dissimilarity flag F1 and the process of the counter CNT1, and further the process of the time stability degree determination flag J1 according to the count value of the counter CNT1 are performed.

Next, with the variable n=2, the control unit 30 compares the local vector LV2 and the global vector GV to each other with respect to the area AR2, and based on the result, performs the process of the vector dissimilarity flag F2 and the process of the counter CNT2, and further the process of the time stability degree determination flag J2 according to the count value of the counter CNT2 in Steps F104 to F116.

Such processes are sequentially performed up to the area AR20. At the time when the processes up to the area AR20 are finished, the processes for the areas AR1 to AR20 for the current frame are completed, and at that time, n≤N (N=20) is not satisfied in Step F103, and thus the control unit 30 proceeds to Step F118.

In Step F118, the control unit 30 determines whether or not there is an area that satisfies the time stability degree determination flag J(n)=1. If all of the time stability degree determination flags J1 to J20 have the value of "0," the control unit 30 returns to Step F101, and executes the processes of Steps F101 to F117 for the next frame.

As described in FIGS. 6 to 8, the time stability degree determination flag J(n) is set to be 1 (=H) when the condition for the vector dissimilarity flag F(n)=1 is satisfied continuously for a predetermined period of time, cumulatively for a predetermined period of time, or averagely in a unit time.

The process example of FIG. 9 shows that the example of the time stability degree determination flag J(n)=1 when the condition for the vector dissimilarity flag F(n)=1 is satisfied for a cumulative or average time.

In other words, if the value of the counter CNT(n) is set to increase when the vector dissimilarity flag F(n)=1 and to be kept when vector dissimilarity flag F(n)=0, when the time of the state of the vector dissimilarity flag F(n)=1 cumulatively reaches the predetermined period of time Tj, the time stability degree determination flag J(n)=1 is set.

In addition, if the value of the counter CNT(n) is set to increase when the vector dissimilarity flag F(n)=1 and to decrease when vector dissimilarity flag F(n)=0, when the time of the state of the vector dissimilarity flag F(n)=1 averagely reaches the predetermined period of time Tj, the time stability degree determination flag J(n)=1 is set.

Note that when the condition for the vector dissimilarity flag F(n)=1 is satisfied continuously for the predetermined period of time and the time stability degree determination flag J(n)=1 is set, the process of FIG. 9 may be altered to a certain degree.

In other words, when the vector dissimilarity flag F(n)=1 is set in F108, the counter CNT(n) increases, and when the vector dissimilarity flag F(n)=0 is set in F109, the counter CNT(n) may be reset. Then, when the state of the vector dissimilarity flag F(n)=1 continuously reaches the predetermined period of time Tj, the time stability degree determination flag J(n)=1 is set.

Note that, in the cases of cumulative determination, average determination, and continuous determination above, it is proper to respectively set different specific determination values corresponding to the predetermined period of time Tj.

While the processes of Steps F101 to F117 are performed over a plurality of frames, there is a certain time point at which the time stability degree determination flag J(n)=1 with regard to one or more areas AR. There are cases in which a user stably targets and captures a certain subject within a captured image for some period of time.

In such a case, the control unit 30 proceeds to Step F120 from Step F118 to perform a final determination process.

Then, the control unit 30 (final determination unit 54) performs main subject determination from an image of an area of which the time stability degree determination flag J(n)=1 is set as the final determination process, and outputs main subject information Dm in Step F130.

With this, the main subject determination process is completed.

Figure 10:
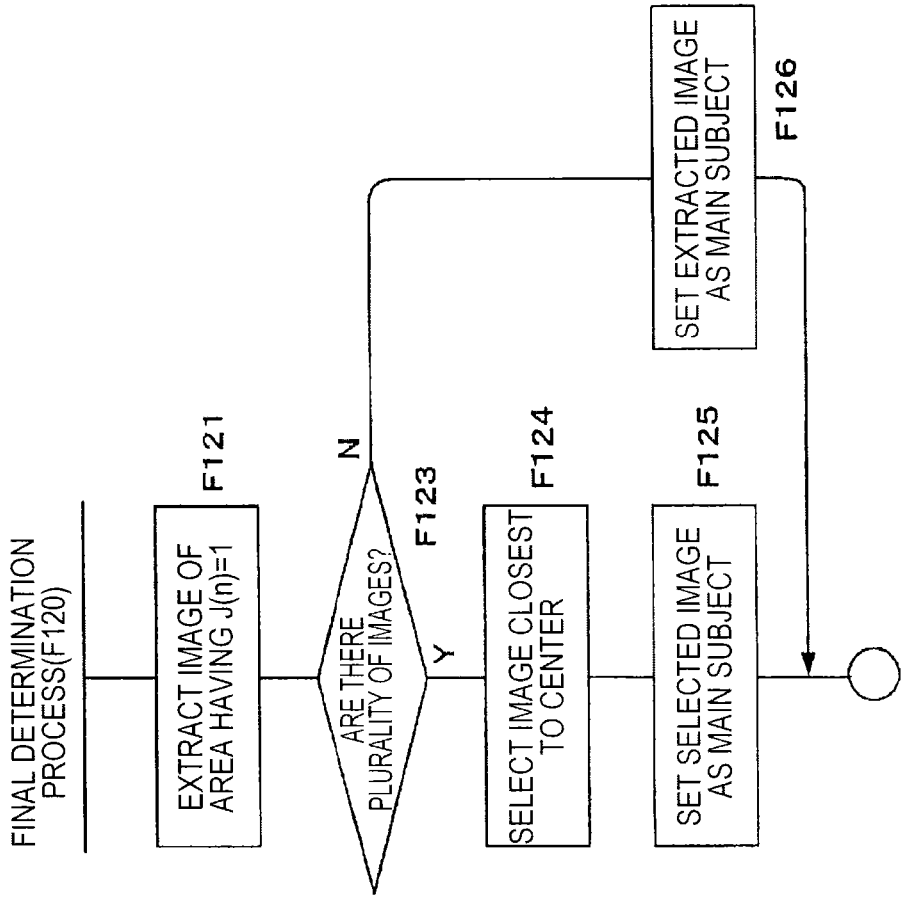
FIG. 10 is a flowchart of a final determination process of the first embodiment.

As the final determination process of Step F120, the processes of FIGS. 10A and 10B are considered.

The process example of FIG. 10A is a process example in which a main subject is determined using a detection result of an area of which a local vector LV(n) is determined to be stably dissimilar to the global vector GV among each of the areas AR1 to AR20, i.e., the time stability degree determination flag J(n) as it is.

The control unit 30 extracts the image of the area of which the time stability degree determination flag J(n)=1 in Step F121. For example, the entire image of the corresponding area may be extracted as it is, or a face image, a human body image, a dog image, a cat image, and the like recognized through an image analysis process of the image in the corresponding area may be extracted.

In addition, a face image or the like may be extracted as a subject image spanning a plurality of areas through an image analysis process that transcends areas, without being limited to the corresponding area.

Furthermore, a plurality of images may be extracted when a plurality of faces are extracted within one area.

Then, the control unit 30 sets the extracted image as a main subject in Step F122.

According to this process, as the time stability degree flag J(n)=1 is set for one or more areas, one or more main subjects are set as images of the one or more areas.

Next, the process example of FIG. 10B is a process example in which an image of the detection result of an area of which the local vector LV(n) is determined to be stably dissimilar to the global vector GV among each of the areas AR1 to AR20, i.e., of a selected area among areas of which the time stability degree determination flag J(n)=1 is determined as a main subject.

The control unit 30 extracts the image of the area of which the time stability degree determination flag J(n)=1 is set in Step F121. As in FIG. 10A, for example, the entire image of the corresponding area may be extracted, or a face image, a human body image, a dog image, a cat image, and the like recognized within the corresponding area may be extracted. Also in such a case, extraction of an image spanning other areas, and extraction of a plurality of images within one area are possible.

In Step F123, the control unit 30 determines whether or not a plurality of images have been extracted.

The case in which a plurality of images are extracted is a case in which there are a plurality of areas of which the time stability degree determination flag J(n)=1 is set and different images are extracted from each of the areas, or a case in which a plurality of images are extracted from the areas even though there is one area of which the time stability degree determination flag J(n)=1 is set.

If there is one extracted image, the control unit 30 proceeds to Step F126, and sets the extracted image as a main subject.

On the other hand, if there are a plurality of extracted images, the control unit 30 proceeds to Step F124. Then, an image that is closest to the center of the screen is selected from the extracted images. For example, x and y coordinates are set on the screen, the coordinates of the center of gravity of each of the extracted images are obtained, the distance between the coordinates of the center of gravity and the coordinates of the center of the screen is determined, and then an image having the shortest distance is selected.

Then, in Step F125, the control unit 30 sets the selected image as a main subject.

According to this process, as the time stability degree flag J(n)=1 is set for one or more areas, one main subject is set from images of the one or more areas according to a position state on the screen.

Note that various selection methods of Step F124 for a plurality of images are considered. For example, the selection may be performed based on a distance to a specific position other than the center or to a position designated by a user, or the like rather than using the position of the center on the screen.

In addition, the selection may be performed under the condition of a size (greatest, smallest, or the like) of an extracted image, a focus state, contrast of an image, or the like, rather than using a position state.

Hereinabove, in the first embodiment, the control unit 30 (main subject determination unit 30a) sets a main subject based on a detection result of an area of which a local vector LV is determined to be dissimilar to the global vector GV among each of the areas AR1 to AR20 on the screen through comparison of the local vector LV and the global vector GV.

The global vector GV indicating a motion of an entire image is a relative motion of all subjects appearing in an image with respect to the imaging apparatus 10 at the time of imaging. On the other hand, the local vector LV(n) indicating a motion of each of the areas AR1 to AR20 in an image is a relative motion of each subject (subject of each of areas in the image) appearing in the image with respect to the imaging apparatus 10 at the time of imaging.

When, for example, a user holds the imaging apparatus and aims at a subject that he or she wants as a target of imaging, the imaging direction is changed in accordance with motions of the subject. Thus, the subject that the user regards as a main subject has a small relative motion with respect to the imaging apparatus within images spanning a plurality of frames. In other words, local vectors of images within the image in which the subject appears are different from the global vector.

Particularly, when the user performs panning, tilting, or the like with regard to the imaging direction, while the global vector GV becomes great, the local vectors LV of images in which the target subject is projected become small.

With the differences of the local vectors and the global vector, a subject that the user regards as a main or leading character can be presumed, and accordingly, automatic main subject determination is possible.

In addition, since a main subject is automatically determined within a captured image as above, it is not necessary for the user such as a photographer to make an action of selecting a main subject. Thus, operability and convenience for the user can be improved. Enhancement of product-added value including improvement of operability when imaging is performed using the imaging apparatus 10 held in a hand, a reduction of stress on users, and further realization of various functions caused by automatic main subject determination can be realized.

In addition, in the first embodiment, a main subject is determined based on a detection result of an area of which a local vector LV is determined to be dissimilar to the global vector GV, particularly, determined to be stably dissimilar under a predetermined time condition in terms of a continuous, cumulative, or average time.

By performing the main subject determination based on the result that the local vector LV is stably dissimilar to the global vector GV using the time condition, accuracy in the determination can be heightened.

In addition, in the first embodiment, a main subject is determined based on a detection result of an area of which a local vector LV is determined to be dissimilar to the global vector GV among areas of which information of local vectors LV has high reliability. In other words, the reliability of the local vectors LV is determined in Step F105 and then reflected on the process of the vector dissimilarity flag F(n).

Accordingly, a local vector LV having low reliability can be excluded from the determination of dissimilarity to the local vectors LV and the global vector GV, and as a result, accuracy in the main subject determination can be heightened.

In addition, the main subject determination unit 30a determines an image of an area among the areas, of which a local vector LV is determined to be dissimilar to the global vector GV, for example, an entire image of the corresponding area or an image extracted from the corresponding area as a main subject.

By extracting an image, for example, a face image, or the like that can be set as a main subject from the corresponding area, for example, a main subject image can be appropriately extracted regardless of division setting, a size, or the like of the area, and thus main subject determination can be performed.

Furthermore, all images extracted from one or more areas can be set as main subjects, or one selected image can be set as a main subject, and therefore main subject determination according to an application that transfers the main subject information Dm or the like is possible.

Note that, in the embodiment, a main subject is set from an area of which a local vector LV is dissimilar to the global vector GV, however, as the condition for dissimilarity, an area of which a local vector LV is determined to be dissimilar to the global vector GV when the global vector GV is detected to be great and the local vector LV to be small may be added.

For example, when a user changes an imaging direction tracking a target subject as panning, tilting, or a random motion, the global vector GV becomes great. On the other hand, since the user changes the imaging direction with respect to the target subject, a local vector LV of the area that includes the subject becomes small.

When main subject determination is to be limited to such a situation, the process of the vector dissimilarity flag F(n) of Steps F108 and F109 may be performed in addition to condition determination of GV>LV.

In other words, if |S(n)|>Th is satisfied in Step F107 when GV>LV, the vector dissimilarity flag F(n)=1 in Step F108.

On the other hand, if GV<LV or |S(n)|>Th is satisfied, the vector dissimilarity flag F(n)=0 is set in Step F109.

On the other hand, however, a process of selecting a main subject from an area of a great local vector LV when a global vector GV is small in a state of the imaging apparatus 10 standing still is also assumed. In terms of this, it is preferable that the condition that the global vector GV be great and the local vector LV be small not be included in the condition for dissimilarity.

Furthermore, it may also be considered that a local vector LV is determined to be dissimilar to the global vector GV by narrowing the condition when the global vector GV is detected to be small and the local vector LV to be great as the condition for dissimilarity.

In addition, various other specific process examples are considered as main subject determination processes based on comparison of vectors as described above.

For example, an area in which a local vector is stably dissimilar to the global vector is detected under a predetermined time condition in terms of a continuous, cumulative, or average time, but a weight of determination may be changed gradually in terms of time.

For example, $\alpha$ and $\beta$ which are values applied to offset values OFS set in Steps F111 and F112 of FIG. 9 are changed according to progress of the process.

When a photographer generally holds a camera and aims at a subject, the photographer fails to capture the subject that he or she wants to set as a leading character at a desired position such as the center of an image or the like at first, but gradually adjusts the orientation of the camera. When the above operation is considered, the position (area) of the subject that the photographer has in mind as a "main subject" is unstable in the image. Then, the subject is gradually captured at a desired position as time progresses.

Thus, during execution of the main subject determination, strengthening a weight of determination of an area of a subject having a different motion from the global vector GV (i.e., gradually increasing the value a of Step F111) as time progresses heightens a possibility of main subject determination that agrees with the thinking of the photographer.

In addition, a process example in which a main subject is determined by setting a fixed main subject determination period, and, within the period, setting an area AR having the highest value of the counter CNT(n) of a time stability degree or one or more areas ARs having a predetermined value thereof or higher as a target of the final determination process of Step F120 is also considered.

5. Second Embodiment

A second embodiment will be described. In the second embodiment, main subject determination is performed based on comparison of vectors as in the first embodiment when there is a motion of an imaging direction of the imaging apparatus 10 (during a change of the imaging direction). On the other hand, it is an example in which, when the imaging direction of the imaging apparatus 10 stands still or does not move much, a degree of stable presence in image data spanning a plurality of frames is obtained for a candidate image extracted from the image data, and a process of determining a main subject in the candidate image using the degree of stable presence.

Figure 11:
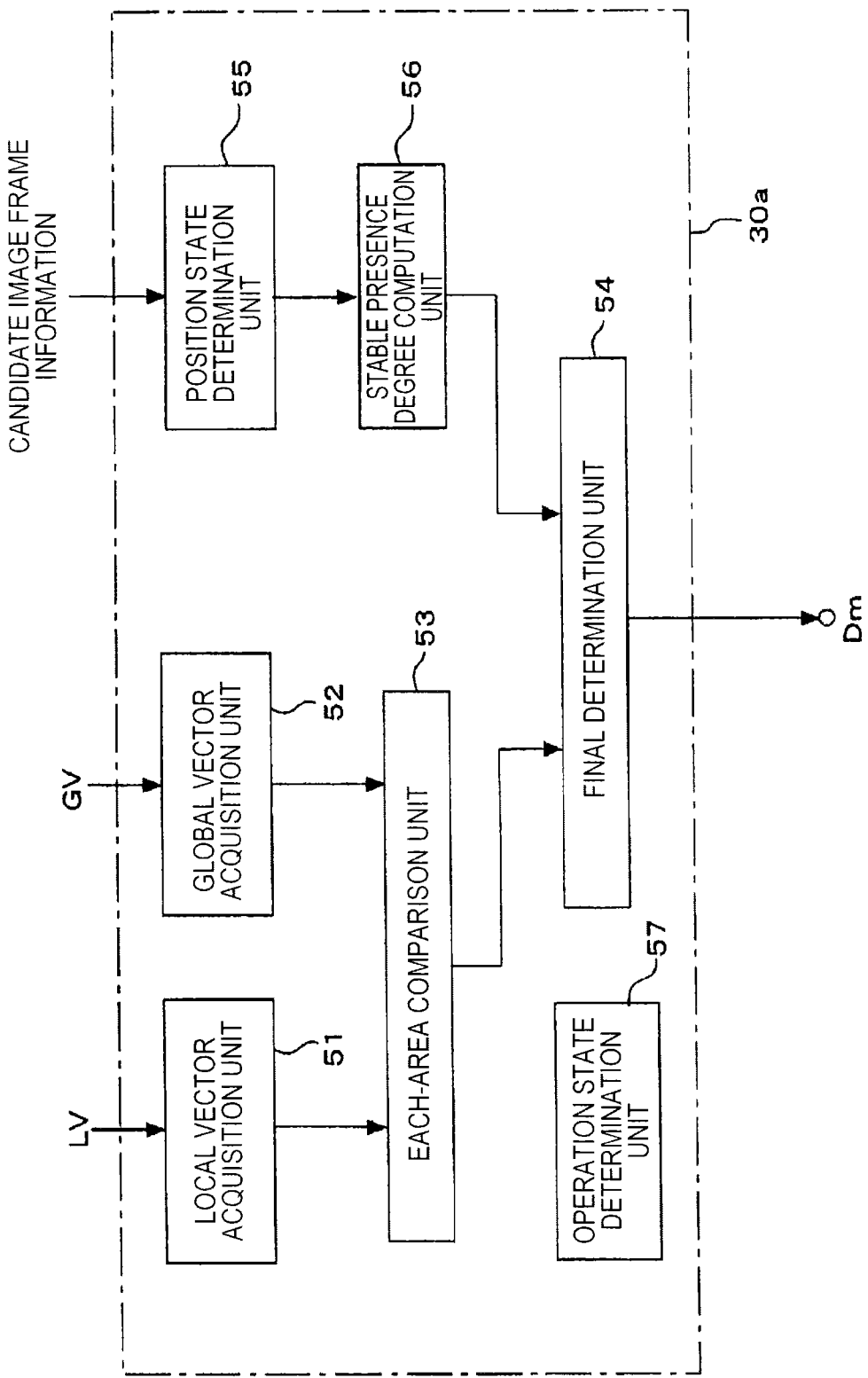
FIG. 11 is a block diagram of a functional configuration of a main subject determination unit of a second embodiment.

A functional configuration of the main subject determination unit 30a of the second embodiment is shown in FIG. 11.

The main subject determination unit 30a includes, for example, the local vector acquisition unit 51, the global vector acquisition unit 52, the each-area comparison unit 53, the final determination unit 54, a position state determination unit 55, a stable presence degree computation unit 56, and an operation state determination unit 57 as shown in FIG. 11 as a functional configuration of software.

The local vector acquisition unit 51, the motion vector detection unit 27, and the each-area comparison unit 53 have the same functions as those in FIG. 4 of the first embodiment.

The position state determination unit 55 and the stable presence degree computation unit 56 have the function of performing a main subject determination process in a stable presence degree mode.

The position state determination unit 55 takes candidate image information from the candidate detection unit 28 shown in FIG. 3. Then, a position state of a candidate image indicated by candidate image information within a field of view is determined.

The stable presence degree computation unit 56 obtains a degree of stable presence of each candidate image in image data spanning a plurality of frames from the position state of the candidate image in each frame which is determined by the position state determination unit 55.

The operation state determination unit 57 determines a current operation state of the imaging apparatus 10. In other words, whether an imaging direction movement in which an imaging direction of the imaging apparatus 10 moves is occurring, or the imaging direction of the imaging apparatus 10 is in a state of standing still or not moving much is determined from, for example, angular velocity and acceleration detection values from the sensor unit 14.

Based on a comparison result of the each-area comparison unit 53 or a computation result of the degree of stable presence from the stable presence degree computation unit 56, the final determination unit 54 performs final determination of a main subject and then outputs main subject information Dm.

A process executed by the main subject determination unit 30a having the functional configuration as above will be described.

Figure 12:
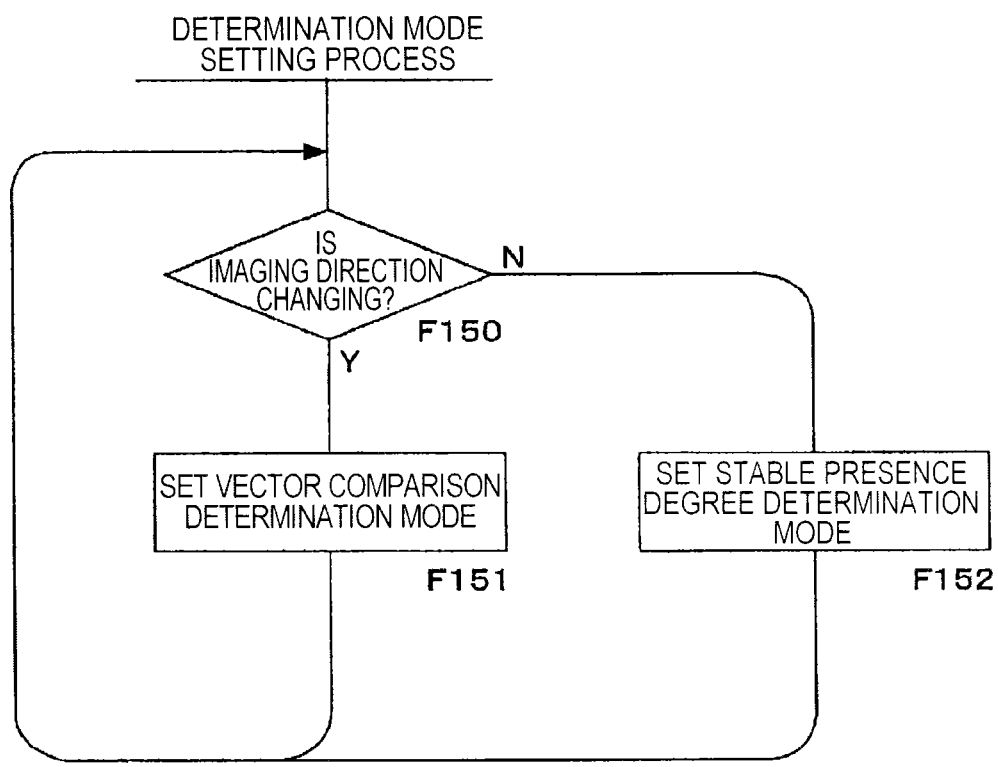
FIG. 12 is a flowchart of a determination mode setting process of the second embodiment.

The control unit 30 (the operation state determination unit 57 of the main subject determination unit 30a) performs mode setting for main subject determination by performing, for example the process of FIG. 12 continuously or at any time.

The control unit 30 determines whether or not the imaging direction is changing in Step F150 of FIG. 12. This determination may be performed when the detection values of the angular velocity and acceleration from the sensor unit 14 are within a predetermined amount.

During the change of the imaging direction, in other words, when a situation in which a user is changing the imaging direction of the imaging apparatus 10 such as panning, tilting, or a random motion is determined, the control unit 30 proceeds to Step F151 to set a vector comparison determination mode.

On the other hand, when the imaging direction is not being changed, in other words, when the imaging apparatus 10 is detected as standing still or a substantially constant trivial motion (for example, camera shake, slight adjustment of the imaging direction, etc.) is merely detected in the imaging direction, the control unit 30 proceeds to Step F152 to set a stable presence degree determination mode.

When the main subject determination process is started by the control unit 30 (main subject determination unit 30a), an algorithm for main subject determination is selected according to mode setting made in the process of FIG. 12.

When a vector comparison determination mode is assumed to be set when the main subject determination process is started at a certain time point, the control unit 30 (main subject determination unit 30a) performs main subject determination in the process described in the first embodiment above through the functions of the local vector acquisition unit 51, the global vector acquisition unit 52, the each-area comparison unit 53, and the final determination unit 54 of FIG. 11.

On the other hand, when a stable presence degree determination mode is assumed to be set when the main subject determination is started, the control unit 30 (main subject determination unit 30a) performs main subject determination using the algorithm as the stable presence degree determination mode which will be described below through the functions of the position state determination unit 55, the stable presence degree computation unit 56, and the final determination unit 54.

Hereinafter, the main subject determination process in the stable presence degree determination mode will be described.

Note that, in the process of the stable presence degree determination mode, a "degree of stable presence" is used as a value serving as an index of automatic main subject determination.

This "degree of stable presence" is a value indicating a frequency of a certain subject being in a predetermined position state within a field of view (to be described later).

For example, it is an index value that enables determination of whether a subject is in a predetermined position state within an image having high accuracy in terms of time.

In other words, it is a value indicating a cumulative time, duration, an average degree of presence, or the like in which a candidate image serving as a candidate for a main subject is present in a predetermined position state as a position state in a field of view, and an image with, for example, a long cumulative time or duration computed as the "degree of stable presence" is set to be able to be presumed as a subject at which a photographer mainly aims.

Note that the "field of view" means a space in which a captured image is displayed. It is used to refer to a two-dimensional space, which is mainly a screen plane of a captured image, or a three-dimensional space that also includes a relative distance of a subject to a camera position at the time of imaging.

The main subject determination process executed by the control unit 30 (main subject determination unit 30*a*) in the stable presence degree determination mode in the imaging apparatus 10 will be described.

A brief process example of the main subject determination process in the stable presence degree determination mode will be described in FIG. 13, and a specific example will be described later in FIGS. 14 to 17.

Figure 13:
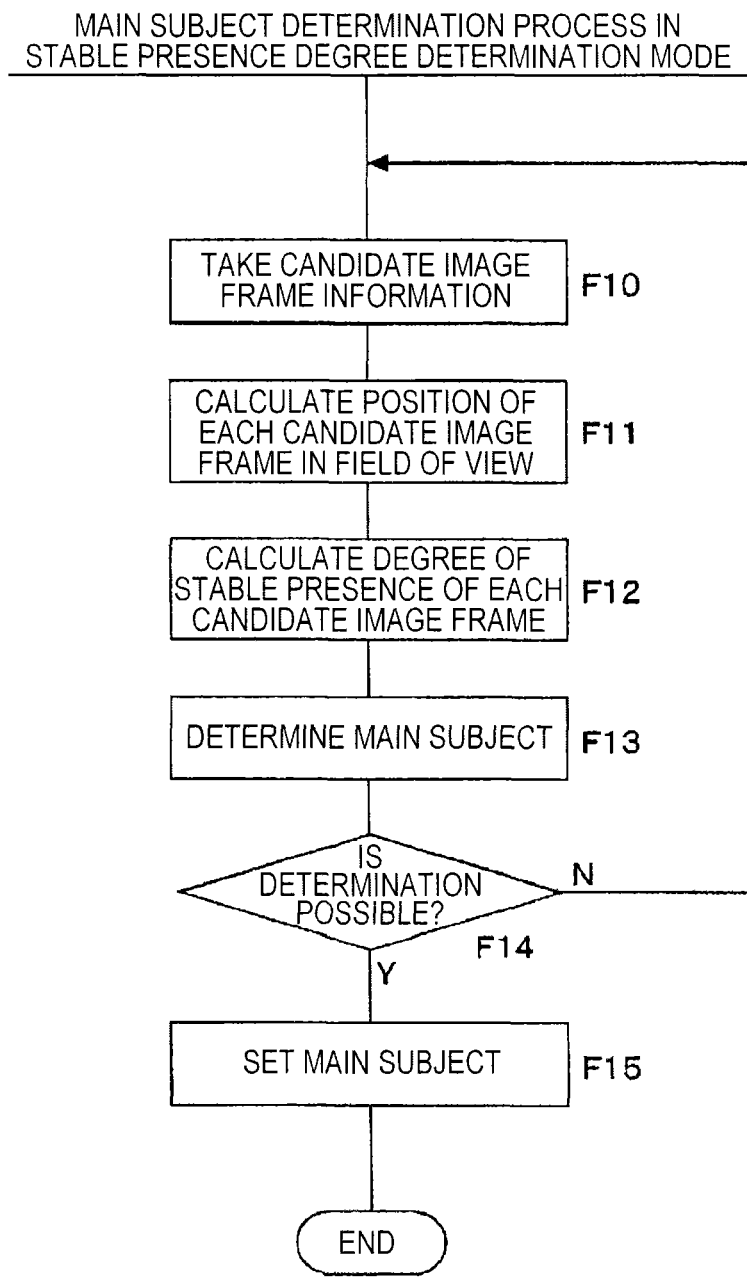
FIG. 13 is a flowchart of a main subject determination process in a stable presence degree determination mode used in the second embodiment.

FIG. 13 shows the main subject determination process in the stable presence degree determination mode.

The control unit 30 (main subject determination unit 30*a*) takes candidate image frame information of one certain frame from the candidate detection unit 28 described in FIG. 3 in Step F10.

The control unit 30 determines position states in Step F11 by performing calculation of positions of one or more candidate image frames represented by the taken candidate image frame information in each field of view.

A "position state" is a term collectively referring to a situation of an absolute or a relative position of a candidate image of image data within a field of view.

Specific examples of the "position state" include:

a relative distance to a certain determination reference point within a field of view;

a relative positional relationship or a relative distance with respect to a certain determination reference area within a field of view;

a position of a candidate image on a two-dimensional plane of a captured image;

a subject distance (a relative distance of a subject with respect to a camera position at the time of imaging);

the relative positional relationship between a subject distance and a determination reference point or a determination reference area; etc.

Herein, a position state is described as an element that determines a distance of a candidate image to a determination reference point set in a field of view.

In Step F12, the control unit 30 calculates a degree of stable presence with regard to each candidate image frame. In this case, the control unit 30 computes cumulative time information indicating that the position state satisfies a predetermined condition as the degree of stable presence. Alternatively, the control unit 30 computes duration information indicating that the position state continuously satisfies the predetermined condition as the degree of stable presence.

Note that, in the computation of the degree of stable presence, position information of the candidate image within the field of view or size information of the candidate image may be used as a condition for the computation.

In Step F13, the control unit 30 determines a main subject using the degree of stable presence.

Here, the determination of Step F13 is a process of determining, as a main subject, a candidate image of which the degree of stable presence has reached a predetermined value most quickly from the start of main subject determination. Alternatively, it is a process of determining a candidate image having the highest value of the degree of stable presence in a period of main subject determination as a main subject.

In addition, in the determination of the main subject, position information of the candidate image within the field of view or size information of the candidate image may also be used in addition to the value of the degree of stable presence.

At the time when a candidate image of which the value of the degree of stable presence has reached the predetermined value is not yet present, or when a predetermined period of main subject determination has not yet passed and a candidate image having the highest value of the degree of stable presence during the period has not been chosen, a main subject is not determined in the process of Step F13. In this case, the control unit 30 returns to Step F10 from F14, and repeats each process. In other words, the same processes are performed by taking the candidate image frame information of frames to be processed next by the candidate detection unit 26.

When a candidate image of which the value of the degree of stable presence has reached the predetermined value at a certain time point is found, or when the predetermined period of main subject determination has passed and a candidate image having the highest value of the degree of stable presence during the period has been chosen, the control unit 30 proceeds to Step F15 from F14. Then, the candidate image determined in Step F13 is set as a main subject.

Note that the main subject determination process of FIG. 13 above is a processing form in which determination is executed while the candidate image information is taken during the period in which main subject determination is performed.

On top of that, taking (buffering) of the candidate image information is performed during a certain period. In addition, a processing form in which main subject determination is performed using the taken candidate image information after the period elapses is also considered.

Next, a specific processing example corresponding to the main subject determination process of FIG. 13 above will be described.

In the specific example below, as a positional state of a candidate image frame, a distance thereof to a set determination reference point is obtained.

In addition, as a degree of stable presence of each candidate image frame, cumulative time information that satisfies the condition that the positional state (distance to the determination reference point) be within a predetermined threshold value is computed.

In addition, a candidate image of which the degree of stable presence has reached a predetermined value most quickly from the start of main subject determination is set to be determined as a main subject.

Figure 14:
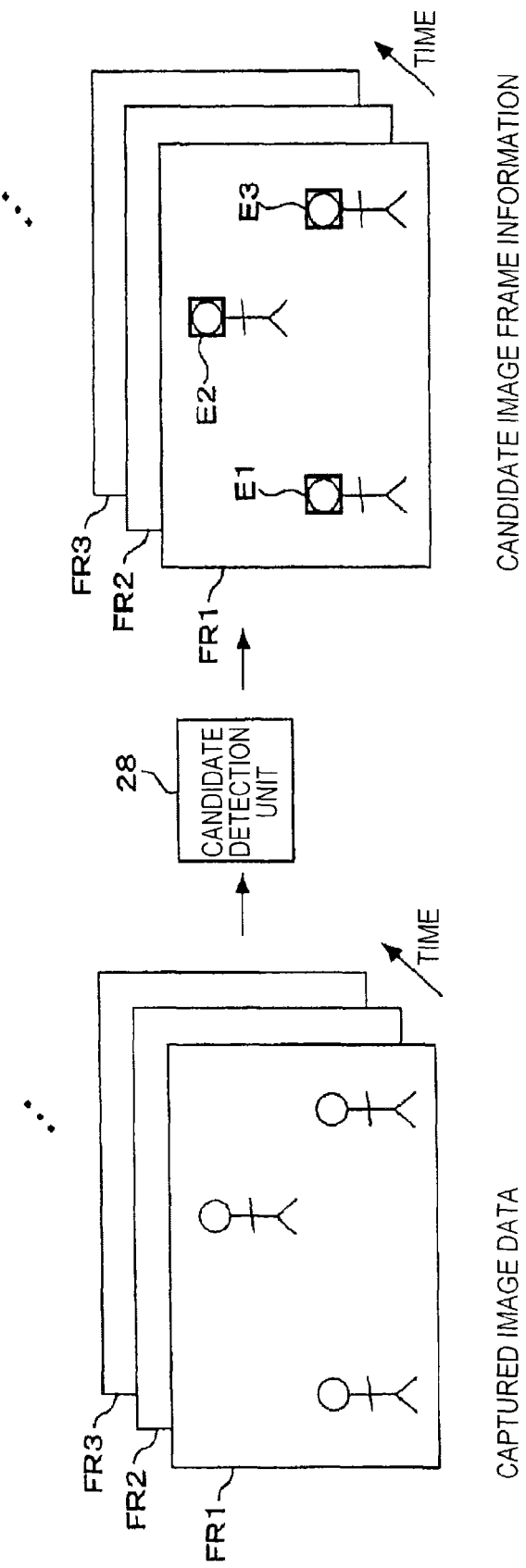
FIG. 14 is an illustrative diagram of candidate image frames and determination reference points of the embodiment.
Figure 16:
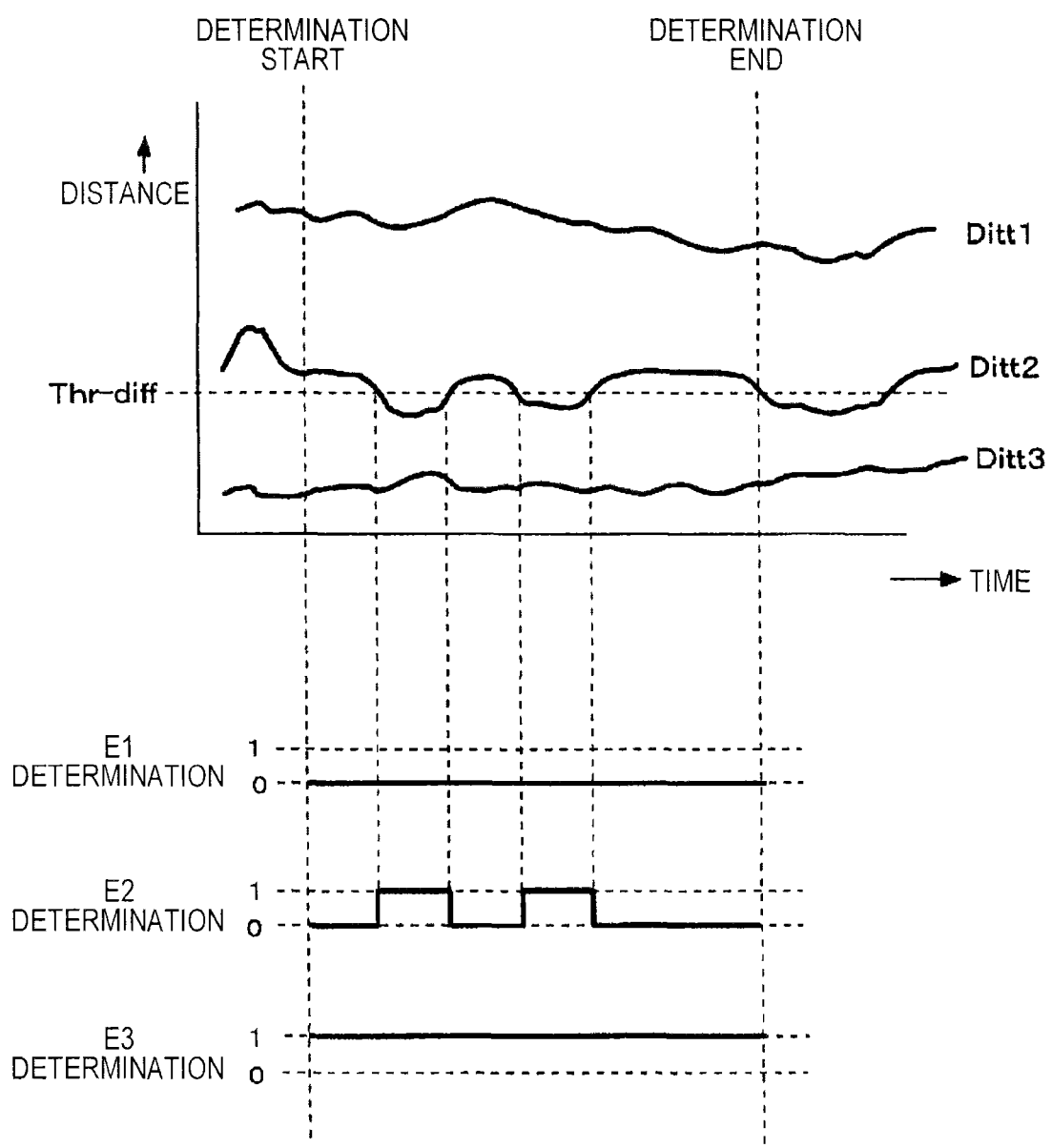
FIG. 16 is an illustrative diagram of stable presence degree determination according to position states of the embodiment.

Therefore, each of candidate image frames, the distance thereof to the determination reference point, and the degree of presence will be first described in FIGS. 14, 15, and 16.

FIG. 14 schematically shows a candidate image frame extraction operation performed in the candidate detection unit 28 shown in FIG. 3.

FIG. 14 shows each of frames FR1, FR2, FR3, . . . of a captured image signal input to the digital signal processing unit 20 through an operation of the optical system 11 and the imager 12 of the imaging apparatus 10. The candidate detection unit 28 performs detection of candidate images for each of the continuous frames sequentially input as above (or for each of intermittent frames).

For example, when there are three persons in the frame FR1 as shown in the drawing, each of the face image portions of the persons is extracted as a candidate image, and then candidate image frame information of candidate image frames E1, E2, and E3 are output. For example, the candidate image frame information of the candidate image frame E1 includes, for example, position information (x and y position information and subject distance information), within the image of the candidate image frame E1, and size information (the width, height and the number of pixels of the frame) and attribute information of the frame, and the like.

The candidate detection unit 28 also generates such candidate image frame information with regard to the candidate image frames E2 and E3, and then transfers the information to the control unit 30 (main subject determination unit 30a).

In the same manner, the candidate detection unit 28 extracts candidate images of the following frames FR2, FR3, . . . , generates candidate image frame information for each of candidate image frames of the images, and then transfers the information to the control unit 30 (main subject determination unit 30a).

The control unit 30 computes a distance to the determination reference point as a positional state of each of the candidate image frames each time the control unit takes the candidate image frame information of each frame.

FIG. 15A shows an example of the determination reference point SP. This is an example in which the center of an image is set to be the determination reference point SP. x and y coordinate values of the determination reference point SP are set to (Cx, Cy).

When the candidate image frame information of each of the candidate image frames E1, E2, and E3 is taken at the time of the frame FR1, for example, the control unit 30 computes the distances Diff1, Diff2, and Diff3 from each of the centers of gravity G of the candidate image frames E1, E2, and E3 shown in the drawing to the determination reference point SP.

Note that setting the determination reference point SP at the center of a screen is an example.

The determination reference point SP may be set at a position, for example, on a slightly upper-left side of the center as shown in FIG. 15B. This is because there are many cases to be considered in which a main subject is better to be disposed at a position that is not the center when, for example, composition of a still image is considered.

Also in the case of FIG. 15B, the distances between each of candidate image frames (for example, E4 or E5) and the determination reference point SP (for example, Diff4 and Diff5) are computed as shown in FIG. 6B.

The determination reference point SP may be set at, for example, such fixed positions as shown in FIGS. 15A and 15B, or may be arbitrarily designated by a user through a touch operation on a display screen or the like. In addition, several candidate points for the determination reference point may be presented on the screen of the display unit 34 to a user so that the user can select one. Furthermore, the control unit 30 is considered to determine an optimum position in consideration of composition and the like according to the content of an image, an image analysis result, and the like for automatic setting.

In other words, the following conditions are considered with regard to the determination reference point SP;
being set at a pre-decided fixed position such as the position of the center of an image, a position deviated from the center, or the like;
being arbitrarily designated by a user;
being set such that several candidate points are presented to a user so that the user can select one;
being flexibly set in an automatic manner by the control unit 30 determining an optimum position according to the content of an image; and the like.

The distance Diff(n) as a positional state of a candidate image frame E(n) is obtained at a time point of each frame.

FIG. 16 shows the state of changes of the computed distances Diff1, Diff2, and Diff3 on the assumption that the candidate image frames E1, E2, and E3 are continuously present in frames (FR1, FR2, . . . ) for a certain period of time.

For example, a case in which a photographer is capturing three subjects for a given period of time using the imaging apparatus 10 is assumed. Because each of the three persons moves independently, the photographer moves a subject distance of the imaging apparatus 10, camera shaking or the like occurs, and each of the computed distances Diff1, Diff2, and Diff3 changes on a time axis.

In a processing example in FIG. 17 that will be described later, a degree of stable presence is set to be a cumulative time during which a subject is close to the determination reference point SP. For this reason, a distance threshold value Thr-diff is used in determining whether a subject is "close or not close."

In the lower part of FIG. 16, determination results of whether or not a distance is within the distance threshold value Thr-diff at each time point of the distance Diff1, Diff2, and Diff3 are shown. if a distance Diff(n) is equal to or shorter than the distance threshold value Thr-diff, being close="1" is set.

The result obtained by cumulatively adding the determination result "1" at each time point is the degree of stable presence of Processing Example 1.

A period from determination start to determination end varies depending on specific processing examples. In the processing example in FIG. 17 that will be described later, the cumulative addition value of the determination result "1" that is equal to or less than the distance threshold value Thr-diff serves as a cumulative time indicating the level of stable presence up until the time point, and a time point at which a candidate image of which the cumulative time has reached a predetermined value is found is the time point of determination end.

In the example of FIG. 16, the candidate image frame E3, for example, is determined to continuously have "1 (=close to the determination referent point SP)," and at the time point at which the cumulative addition value reaches a certain predetermined value, determination ends, and the candidate image frame E3 is determined to be a main subject.

Note that it is assumed that continuity does not matter here. The distance Diff2 of the candidate image frame E2 in FIG. 16, for example, is determined to have "1" and "0" depending on time points, but they invariably relate a cumulative time, and thus when the situation of "1" is frequency and the cumulative time of the frame reaches a predetermined value earlier than other candidate image frames, the candidate image frame E2 can also be determined as a main subject.

However, an example in which continuity is used for the condition for the degree of stable presence is of course considered.

A specific example of the main subject determination process performed by the control unit 30 in the stable presence degree determination mode will be described in FIG. 17.

When the main subject determination process is started in the stable presence degree determination mode, the control unit 30 first sets a count value Cnt(m)=0 in Step F401.

The count value Cnt(m) is a value of a counter that adds the value of a comparison determination result of the above-mentioned distance Diff to the distance threshold value Thr-diff.

Note that "m" indicates natural numbers of 1, 2, 3 . . . and the count value Cnt (m) is set to be a count value corresponding to each detected candidate image frame E (m) like the candidate image frames E1, E2, and E3. When the three candidate image frames E1, E2, and E3 are detected, Cnt1, Cnt2, and Cnt3 are used as count values. For the sake of description of the flowchart, it is advised that a process with regard to the count value Cnt(m) be understood as, for example, a process targeting each of Cnt1, Cnt2, and Cnt3.

In addition, in the same manner, the distance Diff(m) collectively indicates the distances Diff1, Diff2, and Diff3 from the determination reference point SP to each of the three candidate image frames E1, E2, and E3, and a process with regard to the distance Diff(m) is used to mean, for example, a process with regard to each of the distances Diff1, Diff2, and Diff3.

In addition, a candidate image frame E(m) indicates each of the candidate image frames E1, E2, E3 . . . , but it is preferably distinguished for each subject over a plurality of frames. In an example in which the candidate detection unit 26 extracts a face, when a person A, a person B, and a person C are subjects, for example, the face image portion of the person A is set to be the candidate image frame E1, the face image portion of the person B to be the candidate image frame E2, and the face image portion of the person C to be the candidate image frame E3 common in each of the frames. If only a person D is interposed as a subject in a certain middle frame, the face image portion of the person D is set to be a candidate image frame E4. Thus, it is better for the candidate detection unit 26 to not only merely detect a "face" but also determine an entity (individual).

In Step F402, the control unit 30 takes candidate image frame information of a certain frame from the candidate detection unit 28. For example, with regard to each candidate image frame E(m), information including an x value and a y value of two-dimensional (x-y) coordinate values of image data as position information, and a width w and a height h of the candidate image frame as size information are acquired.

Note that the candidate image frame information may also include a subject distance (a relative distance of a subject to a camera position indicated by a value of a z axis direction orthogonal to the two-dimensional (x-y) coordinate plane; z value), the number of pixels, and the like.

In Step F402, the control unit 30 computes the coordinates of the center of gravity G with regard to each candidate image frame E(m).

For example, for the candidate image frame information, the coordinate values of an upper-left vertex of a square-shaped candidate image frame are given as x and y coordinate values of the candidate image frame. The x and y coordinate values are set to (E(m)_x, E(m)_y). In addition, as shown in FIG. 15, the x and y coordinates have the upper-left portion of the screen plane as the origin O (where the x and y coordinate values are (0, 0)).

In addition, the width w of the candidate image frame E(m) is set to E(m)_w and the height h thereof is set to E(m)_h.

Then, if the coordinate values of the center of gravity G of the candidate image frame E(m) are set to (E(m)_cx, E(m)_cy), the coordinate values of the center of gravity G are obtained as follows.

$$E(m)\_cx=E(m)\_cx+E(m)\_w/2$$

$$E(m)\_cy=E(m)\_cy+E(m)\_h/2$$

In Step F404, the control unit 30 computes the distance Diff(m) from the center of gravity G of each candidate image frame E(m) to the determination reference point SP. With coordinate values (Cx, Cy) of the determination reference point SP, the distance is obtained as follows.

$$\text{Diff}(m)=\sqrt{\{(E(m)\_cx-Cx)^2+(E(m)\_cy-Cy)^2\}}$$

In Steps F405, F406, and F407, the control unit 30 checks whether or not each candidate image frame E(m) satisfies predetermined conditions with regard to the distance Diff (m).

In other words, whether or not the distance Diff(m) to the determination reference point SP is close to the determination reference point SP is determined using the distance threshold value Thr-diff.

To this end, the control unit 30 compares the distance Diff(m) from each candidate image frame E(m) to the determination reference point SP to the distance threshold value Thr-diff in Step F405, and if Diff(m)<Thr-diff is satisfied, a flag Flg(m)=1 (close) is set in Step F406. In addition, if Diff(m)<Thr-diff is not satisfied, the flag Flg(m) =0 (not close) is set in Step F407.

Next, in Steps F408 and F409, the control unit 30 computes the degree of stable presence of each candidate image frame E(m). In this case, in Step F408, whether or not the flag Flg(m)=1 is satisfied is checked for each candidate image frame E(m), and if the flag Flg(m)=1 is satisfied, the count value Cnt(m) increases (I is added) in Step F409. When the flag Flg(m)=0, the count value Cnt(m) does not change.

The count value Cnt(m) serves as the value of the degree of stable presence as the cumulative addition value described above. In other words, it is the value indicating the frequency of the candidate image frame E(m) in the state of being "close" to the determination reference point SP.

Next, the control unit 30 checks in Step F410 whether or not the count value Cnt(m) of each candidate image frame E(m) has reached a count threshold value CThr.

If Cnt(m)≥CTthr is not satisfied, in other words, if any count value Cnt(m) of each candidate image frame E(m) has not reached the count threshold value CTthr, the process returns to Step F402. In this case, the processes of Step F402 and the succeeding steps are executed based on candidate image frame information input for the next frame in the same manner as described above.

Since the main subject determination based on the degree of stable presence is made for over a certain time length, if the process with regard to the candidate image frame information is not performed for a certain period of time (a number of frames), the process returns to Step F402 from Step F410 and processes are repeated as described above.

Here, for example, a certain candidate image frame E3 shown in FIG. 16 may be discontinuous, but a situation in which the frame is present in a position close to the determination reference point SP in a plurality of frames on a captured image with a high frequency is assumed. Thus, many opportunities in which the count value Cnt3 of the candidate image frame E3 increases in Step F409 are created as time goes by, and a count value Cnt3 is obtained more quickly than count values Cnt1 and Cnt2.

Then, the count value Cnt3 reaches the count threshold value CTthr for the first at a certain time point.

In such a case, the control unit 30 causes the process to proceed from Step F410 to F420.

In Step F420, the control unit 30 determines a candidate image frame E(m) of which the count value Cnt(m) has reached the count threshold value CTthr as a main subject and then performs main subject setting.

Then, in Step F430, the control unit 30 outputs the main subject information Dm, thereby finishing the main subject determination process.

Figure 17:
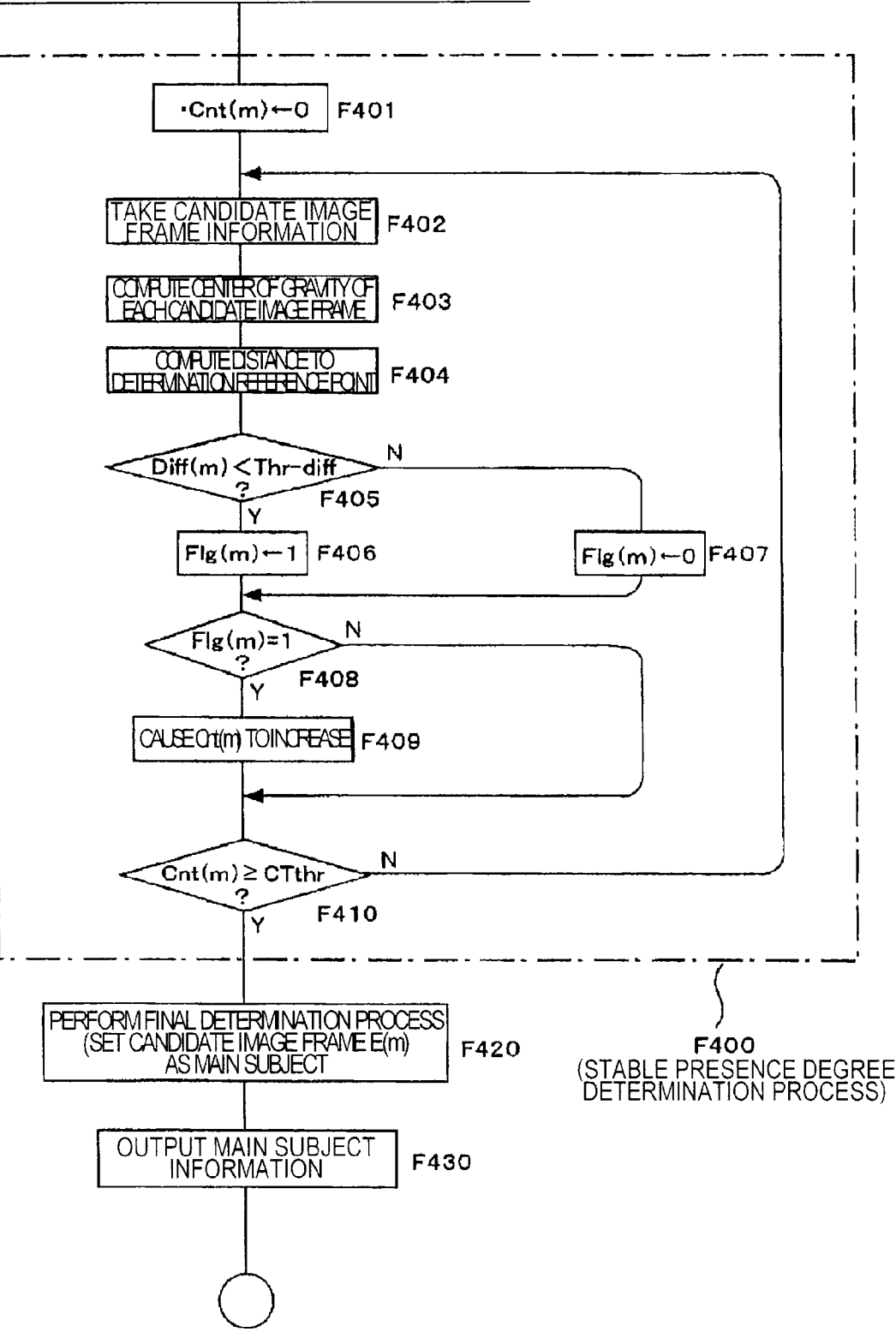
FIG. 17 is a detailed flowchart of the main subject determination process in the stable presence degree determination mode of the embodiment.

According to the processing example in FIG. 17, as a user holds the imaging apparatus 10 (tracks a subject) so that the subject that the user wants to primarily capture is as close to the determination reference point SP such as the center of an image, or the like as possible, the subject is automatically determined as a main subject.

Particularly, in the main subject determination process in the stable presence degree determination mode, the degree of stable presence is determined based on a cumulative time of the state of being "close" to the determination reference point SP. In the case of a subject moving around or a subject making quick movements such as an animal, there are cases in which a photographer has difficulty in continuously capturing a subject of interest at the center of an image for a certain period of time (for example, even for about several seconds). In addition, there are also cases in which it is quite difficult to keep a desired subject at the center of an image due to serious camera shaking or the like depending on a photographer's skills. Even in such cases, main subject determination can be made relatively quickly using a cumulative time.

Therefore, the cumulative time is useful for a target subject that moves quickly or for a relatively inexperienced user.

In addition, since the main subject determination process does not have to be performed for a fixed period of time and the process ends at the time when a main subject is determined, it is advantageous in that a main subject determination is quickly established depending on subjects and photographer's skills.

Note that other various specific processing examples are considered as the main subject determination process in the stable presence degree determination mode.

As a degree of stable presence of each candidate image frame, for example, duration information that a positional state (distance to the determination reference point) continuously satisfies the condition for being within a predetermined threshold value may set to be computed.

In a case where, it is evaluated whether or not a frame is stably present based on duration, when a subject that moves little is targeted, the target subject can be continuously captured at the center of an image or the like with ease, and thus there is a high possibility of being able to accurately set a main subject desired by the user. In addition, depending on photographers' skills, a subject desired to be primarily captured can be continuously kept at the center of an image or the like (a position close to the determination reference point SP), and thus there is a high possibility of being able to accurately determine a subject desired by a photographer as a main subject. In other words, it is possible to further raise a possibility of being able to determine a subject desired by a user as a main subject depending on a photographer having an advanced level of photographing skill or subjects.

In addition, weighting may be performed in the computation of the degree of stable presence. It is given such that, for example, a value close to the determination reference point SP is weighted to time points after the execution period of the main subject determination process or the like.

When a photographer holds a camera normally while aiming at a subject, the photographer has difficulty capturing the subject of interest at a desired position such as the center of an image at first, and gradually adjusts the orientation of the camera. Taking this situation into consideration, the subject that the photographer has in mind as a "main subject" at first is gradually captured at the center of the image as time elapses.

Thus, during the execution of the main subject determination process, weighting a value close to the determination reference point SP as time elapses heightens the possibility of being able to determine a main subject that matches the photographer's intentions.

In addition, with regard to the computation of the degree of stable presence, adding a condition in addition to the condition of whether or not the distance Diff(m) is equal to or shorter than the distance threshold value Thr-diff is also considered. For example, a condition that a subject distance be in a predetermined range, a size be in a predetermined range, an image be a specific image type or the like may be added.

In addition, a processing example in which a certain main subject determination period is set, and a candidate image having a highest degree of stable presence for the period is determined as a main subject is also considered.

In addition, in the above-described processing example, the positional relationship with the set determination reference point is set as a positional state of each candidate image frame, but the positional relationship with a determination reference area may be set.

For example, an area in a square shape, a circular shape, or the like such as the center of an image is set, and the area is set as a determination reference area. The positional relationship of each candidate image frame E(m) with the determination reference area is defined based on, for example:

whether or not the center of gravity of the frame is included in the determination reference area;

whether or not the entire frame is included in the determination reference area;

whether or not at least a part of the frame is included in the determination reference area;

whether or not the distance to an outer edge of the determination reference area is within a predetermined value; and the like.

Under the conditions of the positional relationship, a degree of stable presence can also be obtained.

In addition, as a degree of stable presence of each candidate image frame, the average value of positional states (for example, a distance to the determination reference point) may be set to be computed. An average distance serves as an index indicating a positional state of a frame being close to the determination reference point with a high temporal frequency. For example, "a low value of the average distance" has the same meaning as "a long cumulative time" mentioned in the above-described processing example. In addition, a candidate image frame that satisfies the condition that the average distance be the shortest and within a predetermined threshold value can also be determined as a main subject.

In the second embodiment described above, the control unit 30 (main subject determination unit 30a) determines a main subject based on an area that has a local vector LV that is determined to be dissimilar to a global vector GV with regard to image data that is being subjected to a change of an imaging direction.

In addition, when image data that is not being subjected to a change of an imaging direction is a target of the main subject determination process, a degree of stable presence of candidate images extracted from the image data within the image data spanning a plurality of frames is obtained, and then using the degree of stable presence, a main subject is determined among the candidate images.

In other words, the algorithm for main subject determination is set to be switched between a case in which there is a motion of the imaging apparatus 10 itself and a case in which there is none.

For example, during a change of an imaging direction such as panning or tilting, it is highly likely that a certain target subject, particularly a moving subject is being tracked, and in such a case, main subject determination that uses motion vectors is particularly appropriate.

When, however, the imaging apparatus 10 itself is standing still, when a user is holding the imaging apparatus 10 without changing the imaging direction much, or the like, the main subject that the user is aiming at is presumed not to be moving much. In such a case, the difference between a local vector LV of an area on the image of the target subject and a global vector GV might not be distinct. Thus, in such a case, the algorithm for main subject determination can be switched for the process of the stable presence degree determination mode. The process of the stable presence degree determination mode is appropriate for performing main subject determination on a subject that stands still since the process uses stability of a position state as an index as understood from the above description.

In other words, according to the second embodiment, a proper main subject determination process is executed according to a situation of the imaging apparatus 10, and accordingly, more proper main subject determination is realized.

6. Third Embodiment

A third embodiment will be described. In the third embodiment, areas serving as candidates for a main subject are obtained in the same process as the vector comparison determination mode, candidate images are set based on the areas, and then main subject determination is performed using the candidate images in the same process as the stable presence degree determination mode.

Figure 18:
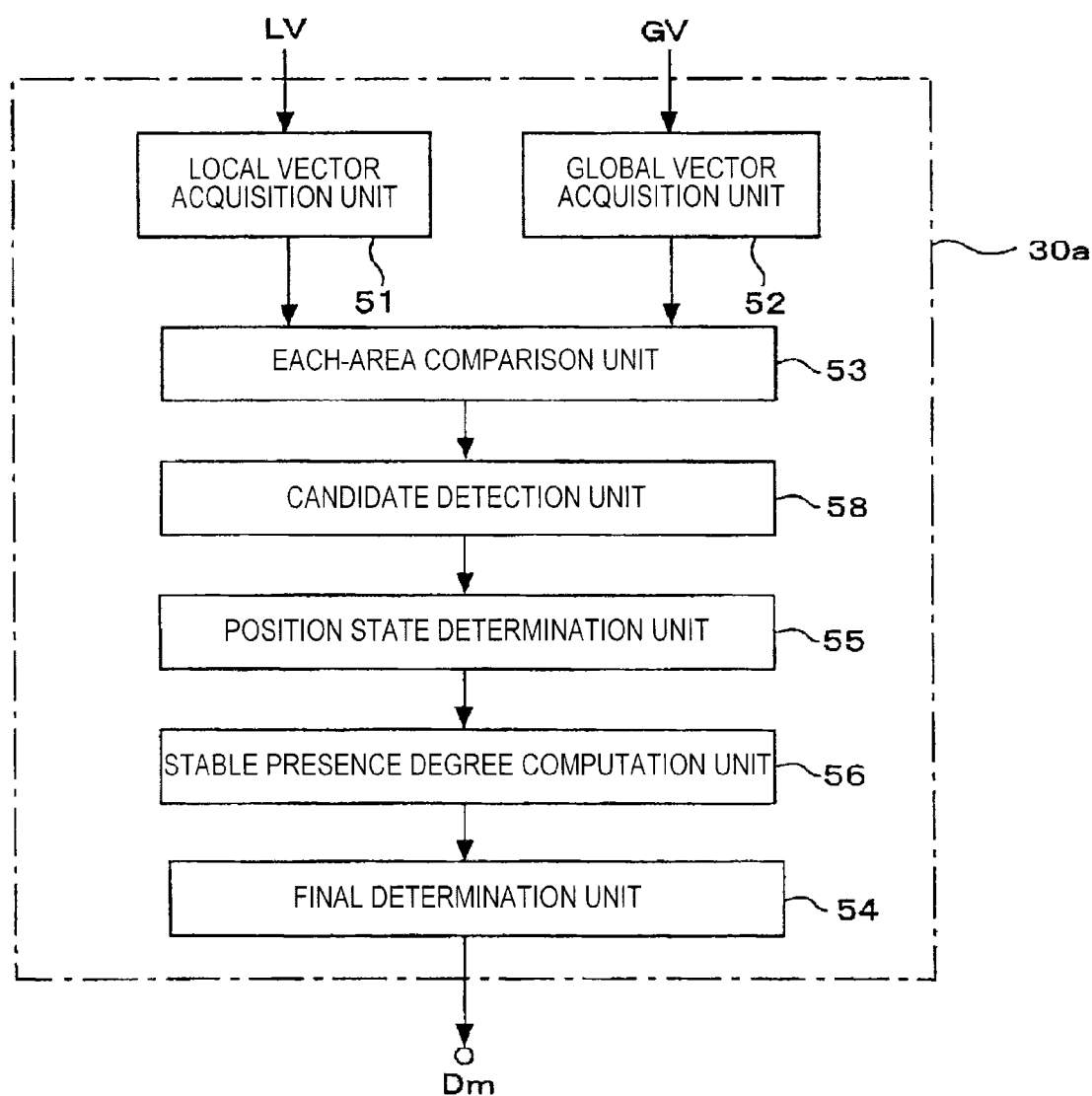
FIG. 18 is a block diagram of a functional configuration of a main subject determination unit of a third embodiment.

A functional configuration of the main subject determination unit 30a in the third embodiment is shown in FIG. 18.

The main subject determination unit 30a includes the local vector acquisition unit 51, the global vector acquisition unit 52, the each-area comparison unit 53, the final determination unit 54, the position state determination unit 55, the stable presence degree computation unit 56, and a candidate detection unit 58 as shown in FIG. 18 as a functional configuration of software.

The local vector acquisition unit 51, the motion vector detection unit 27, and the each-area comparison unit 53 have the same functions as those in FIG. 4 of the first embodiment.

A detection result of the each-area comparison unit 53 is, however, transferred to the candidate detection unit 58. The candidate detection unit 58 has the same function as the candidate detection unit 28 shown in FIG. 3. Although the candidate detection unit 58 is shown herein as a function of the control unit 30, it may be configured as the candidate detection unit 28 of the digital signal processing unit 20 as shown in FIG. 3.

The position state determination unit 55 and the stable presence degree computation unit 56 have the function of performing the main subject determination process in the stable presence degree determination mode, and thus are the same as described in FIG. 11. The position state determination unit 55 takes candidate image frame information from the candidate detection unit 28. Then, the stable presence degree computation unit 56 computes a degree of stable presence of each candidate image indicated in the candidate image frame information. The final determination unit 54 performs main subject determination based on a process result of the stable presence degree computation unit 56.

Figure 19:
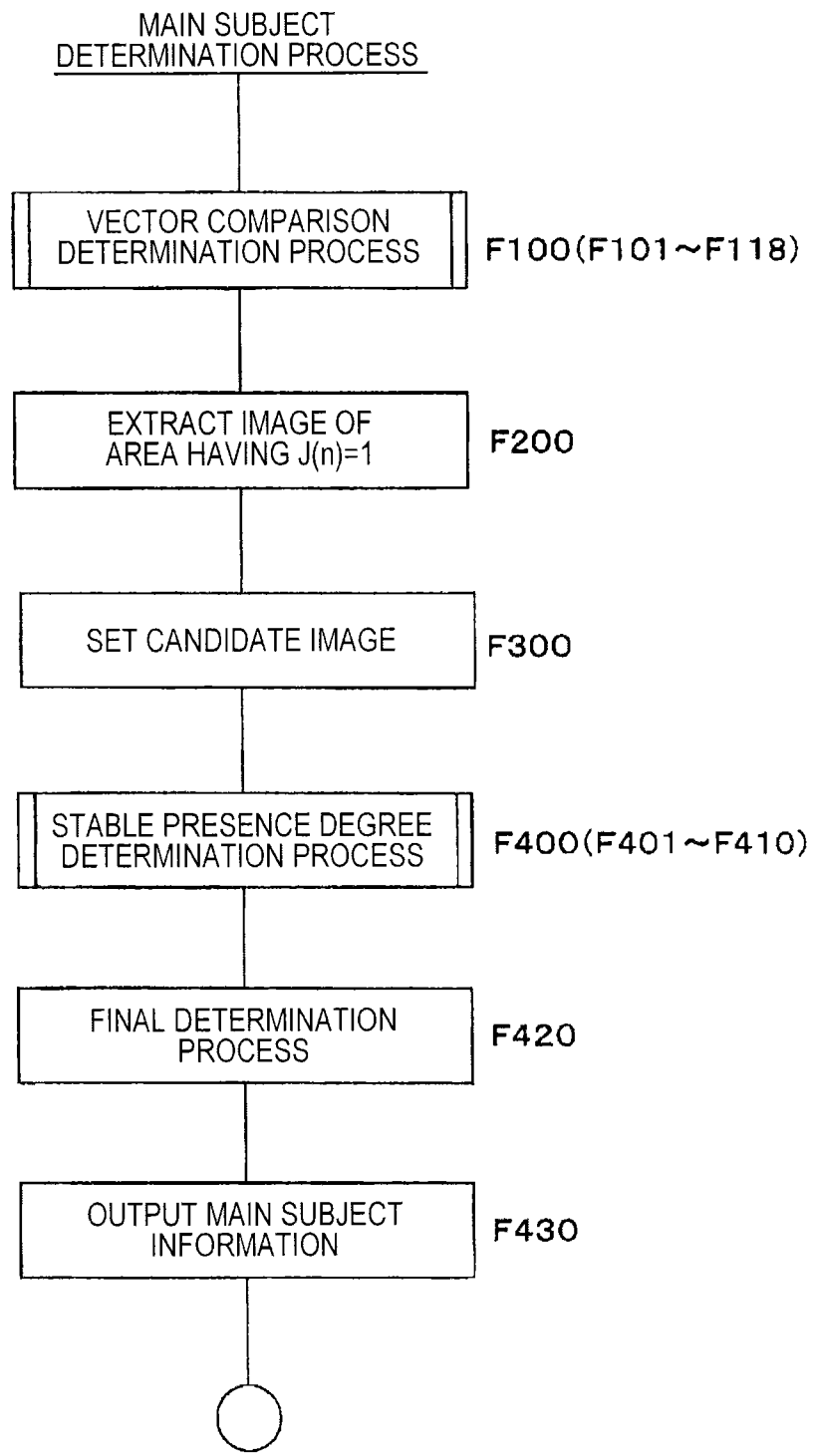
FIG. 19 is a flowchart of a main subject determination process of the third embodiment.

A main subject determination process of the third embodiment is shown in FIG. 19.

The control unit 30 (main subject determination unit 30a) first performs a vector comparison determination process as Step F100.

The vector comparison determination process is the processes of Steps F101 to F118 surrounded by the dashed-dotted line in FIG. 9. Overlapping description thereof will be avoided, however, through the vector comparison determination process, information of an area of which a local vector LV is determined to be stably dissimilar to a global vector GV, i.e., information of a time stability degree determination flag J(n), is obtained.

In Step F200, the control unit 30 extracts an image from an area AR having the time stability degree determination flag J(n)=1 using the function as the candidate detection unit 58.

For example, the control unit 30 extracts an image by performing face image detection, human body image detection, and the like on the image of the area AR that is set to have the time stability degree determination flag J(n)=1. Although face detection, human body detection, and the like are possible using a technique such as pattern matching for image analysis with respect to captured image data. An image may be extracted through dog face detection, cat face detection, and the like merely by replacing a dictionary that is used for the pattern matching.

In addition, in a technique of motion body detection based on a frame difference using the image of the area AR in front and rear frames, for example, detecting a dynamic body and extracting an image of the moving body may be considered, and a technique of area-of-interest extraction that is called saliency (Saliency) may be used. Various techniques of extraction and selection of an image are considered.

In Step F300, the control unit 30 sets one or more images extracted as above as candidate images (candidate image frames E(m)) serving as candidates for a main subject.

In Step F400, the control unit 30 performs the stable presence degree computation process with respect to the candidate images (candidate image frames E(m)) set as described above using the functions of the position state determination unit 55 and the stable presence degree computation unit 56. This Step F400 is the processes of Steps F401 to F410 surrounded by the dashed-dotted line in FIG. 17. Although overlapping description thereof will be avoided, the process proceeds to Step F420 from Step F410 at a certain time point.

Steps F420 and F430 of FIG. 19 are also the same as Steps F420 and F430 of FIG. 17.

Consequently, a candidate image frame E(m) of which the count value Cnt(m) of the degree of stable presence described in FIG. 17 has reached the count threshold value CTthr is determined as a main subject, and then main subject setting is performed.

Then, in Step F430, the control unit 30 outputs the main subject information Dm, thereby finishing the main subject determination process.

In the third embodiment as described above, the control unit 30 (main subject determination unit 30a) sets an image of an area of which a local vector LV is determined to be dissimilar to the global vector GV among the areas AR1 to AR20 obtained by dividing a screen as a candidate image. Then, with respect to each candidate image, a degree of stable presence in image data spanning a plurality of frames is obtained, and using the degree of stable presence, a main subject is determined among candidate images.

According to the third embodiment as described above, candidates for a main subject are roughly detected in the vector comparison determination process, and then a main subject can be determined from the candidate images with high accuracy in the process of the stable presence degree determination mode. By executing both the vector comparison determination process and the stable presence degree determination process, main subject determination with high accuracy is realized.

7. Application to a Program and a Computer Device

Hereinabove, the embodiments of the image processing device 1 and the imaging apparatus 10 have been described, and the above-described main subject determination process can be executed by hardware, or by software.

A program of an embodiment is a program that causes an arithmetic operation processing device, for example, a CPU (Central Processing Unit), a DSP (Digital Signal Processor), or the like, to execute the processes shown in the above-described embodiments.

In other words, the program is a program that causes the arithmetic operation processing device to execute a process of acquiring information of a global motion indicating a motion of an entire image, acquiring information of local motions indicating motions of each area in the image, and determining a main subject based on a result obtained by comparing the global motion and the local motions.

To be specific, the program of the embodiment may be a program that causes the arithmetic operation processing device to execute the process shown in FIG. 2, FIG. 9, or FIG. 19. Using such a program, a device that executes the above-described main subject determination process can be realized using the arithmetic operation processing device.

Such a program can be recorded in advance on an HDD as a recording medium embedded in an appliance such as a computer device, a ROM in a microcomputer having a CPU, and the like.

Alternatively, the program can be temporarily or permanently stored (recorded) in a removable recording medium such as a flexible disk, a CD-ROM (Compact Disc Read Only Memory), a MO (Magnet optical) disc, a DVD (Digital Versatile Disc), a Blu-ray Disc, a magnetic disk, a semiconductor memory, or a memory card. Such a removable recording medium can be provided as so-called package software.

Furthermore, such a program can be downloaded from a download site through a network such as a LAN (Local Area Network) or the Internet, in addition to the installation from the removable recording medium to a personal computer and the like.

Furthermore, such a program is suitable for the image processing device of the embodiment to be extensively provided. For example, the program is downloaded to a personal computer, a portable information processing apparatus, a cellular phone, a game device, a video player, a PDA (Personal Digital Assistant) and the like, so that the portable information processing device and the like are available as the image processing device according to an embodiment of the present disclosure.

Figure 20:
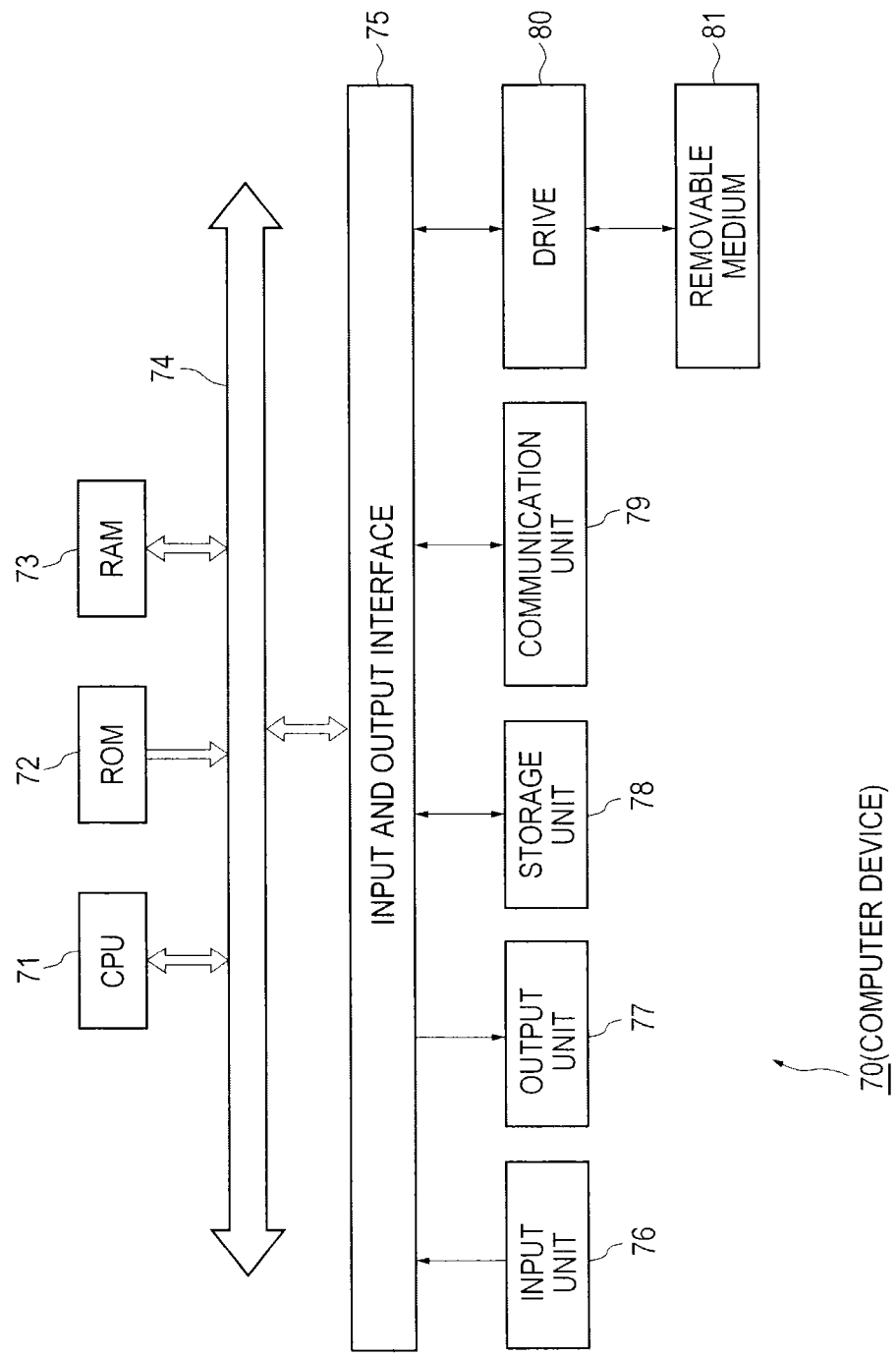
FIG. 20 is a block diagram when an embodiment is applied to a computer device.

For example, in the computer device as illustrated in FIG. 20, the same process as the main subject determination process can be performed in the image processing device 1 of FIG. 1, and the imaging apparatus 10.

In FIG. 20, a CPU 71 of a computer device 70 performs various processes according to a program stored in a ROM 72 or a program loaded from a storage unit 78 to a RAM 73. Furthermore, the RAM 73 appropriately stores data and the like which are necessary when the CPU 71 performs the various processes.

The CPU 71, the ROM 72, and the RAM 73 are connected to one another through a bus 74. Furthermore, an input and output interface 75 is also connected to the bus 74.

The input and output interface 75 is connected to an input unit 76 including a keyboard, a mouse and the like, an output unit 77 including a display such as a CRT (Cathode Ray Tube), an LCD, or an organic EL panel, and a speaker, the storage unit 78 including a hard disk, and a communication unit 79 including a modem and the like. The communication unit 79 performs a communication process through a network including the Internet.

Furthermore, a drive 80 is connected to the input and output interface 75 according to necessity, a removable medium 81 such as a magnetic disk, an optical disc, a magneto optical disc, or a semiconductor memory is appropriately mounted thereon, and a computer program read from the drive is installed in the storage unit 78 according to necessity.

When the aforementioned main subject determination process is performed by software, a program constituting the software is installed from a network or a recording medium.

The recording medium, for example, as illustrated in FIG. 20, is configured by the removable medium 81 including a magnetic disk (including a flexible disk), an optical disc (including a Blu-ray disc (registered trademark), a CD-ROM (Compact Disc-Read Only Memory), and a DVD (Digital Versatile Disc)), a magneto optical disc (including a MD (Mini Disc)), a semiconductor memory and the like which are distributed to deliver a program to a user, separately from an apparatus body with the program recorded therein. Alternatively, the recording medium is also configured by the ROM 72, a hard disk included in the storage unit 78, and the like, which are delivered to a user in the state of being incorporated in advance into the apparatus body with the program recorded therein.

In the computer device 70, when dynamic image data is input through a reception operation by the communication unit 79, or a reproduction operation in the drive 80 (removable medium 81) or the recording unit 78, the CPU 71 executes the functions of the main subject determination units (2 and 30a) described above based on the program. In other words, by executing the process of FIGS. 2, 9, and 19, a main subject can be determined automatically regarding the input image data.

8. Modified Example

Various modified examples with respect to the above-described embodiments are considered.

First, with respect to the vector comparison determination process, vector values (directions and quantities) of a local vector LV and a global vector GV are compared to each other, however, an example in which only directions or only quantities (scalar) are compared is also considered.

When only directions are compared, for example, a process in which determination is performed on whether or not an angle θ formed by two vectors including the local vector LV and the global vector GV is equal to or higher than a predetermined angle and then a vector dissimilarity flag F(n) is set is possible.

As in the case of scalar comparison, a process in which determination is performed on whether or not the difference between scalar values of the local vector LV and the global vector GV is equal to or greater than a predetermined value and then a vector dissimilarity flag F(n) is set is possible.

The division of the area AR is variously considered.

The example in which the area is divided into 20 including the areas AR1 to AR20 has been described, but the number of divisions is of course not limited. Division into 4, 6, 8, 9, . . . , 30, 40, and the like is possible.

As the number of areas of division increases, a load of the comparison process of a local vector LV and a global vector GV becomes heavier, however, main subject determination with high accuracy is possible in any zoom state or even when a subject is small. On the other hand, a load of the process becomes lighter when the number of divisions is lower.

All divided areas do not have to have the same sizes or the same area shape. It is also considered that, for example, one area of the end parts of an image is set as a wide range and the center part of the screen is divided into fine areas. Considering that a main subject is highly likely to be positioned in the periphery of the center of the screen, dividing the center of the screen into small areas is appropriate.

In addition, an example in which a process of face detection or the like is performed and a face area is used as one area AR is also considered. For example, a face area of which a local vector is different from a global vector among several detected face areas is determined as a main subject.

It is preferable to appropriately change setting of the threshold values Th+ and Th− (refer to FIG. 7, FIG. 8, and Step F107 of FIG. 9) which are used in the vector comparison determination process or the predetermined period of time Tj (refer to Step F114 of FIG. 9) for time stability degree determination according to a product as the imaging apparatus 10 or the image processing device 1, a user form thereof, and the like. In addition, the user may be able to arbitrarily set a desired value.

Based on the setting of the threshold values Th+ and Th−, a criterion by which an image can be set as a main subject can be changed. In addition, based on the setting of the predetermined period of time Tj, whether quick determination should be prioritized or determination with high accuracy should be prioritized can be selected.

A process example in which the second and third embodiments are combined is also considered.

In such an example, the process of the third embodiment is performed when, for example, panning is performed and the vector comparison determination mode is set in the process of FIG. 12, and the process of FIG. 17 is performed when the stable presence degree determination mode is set.

In addition, the main subject information has been described as also being used in an image effect process and an image editing process, however, it is also preferable to perform the main subject determination process targeting a reproduced image to this end.

The main subject determination process targeting a reproduced image is of course assumed in the image processing device of FIG. 1, the information processing device of FIG. 20, and the like.

In addition, a result of the main subject determination process may be added to still image data or dynamic image data imaged and recorded thereafter as metadata. In other words, information representing a main subject is added to a still image file, or the like.

In addition, manipulation of designating a main subject through manipulation by a photographer may be set to be possible while a through image is displayed and, at the same time, the main subject determination process is performed.

Furthermore, the process of determining a main subject has been described mainly on the assumption of capturing still images in the embodiments, however, the process of the embodiments described above can be applied as a process of performing main subject determination on a plurality of captured frames during standby for capturing a dynamic image, and capturing and execution of recording of a dynamic image.

Additionally, the present technology may also be configured as below.

(1)

An image processing device including:
a global motion detection unit configured to detect a global motion indicating a motion of an entire image;
a local motion detection unit configured to detect a local motion indicating a motion of each of areas of an image; and
a main subject determination unit configured to determine a main subject based on the global motion and the local motion.

(2)

The image processing device according to (1), wherein the main subject determination unit determines an area of which the local motion is dissimilar to the global motion among the areas.

(3)

The image processing device according to (1) or (2), wherein the main subject determination unit determines an area of which the local motion is stably dissimilar to the global motion among the areas.

(4)

The image processing device according to (3), wherein the main subject determination unit determines an area that has been determined to be dissimilar under a predetermined time condition in terms of a continuous, cumulative, or average time as being stably dissimilar among the areas.

(5)

The image processing device according to any one of (1) to (4), wherein the main subject determination unit determines a main subject based on the local motion having high reliability and the global motion.

(6)

The image processing device according to any one of (1) to (5), wherein the main subject determination unit determines an image extracted from an area of which the local motion is determined to be dissimilar to the global motion among the areas as a main subject.

(7)

The image processing device according to any one of (1) to (5), wherein the main subject determination unit determines an image of an area selected from areas of which the local motion is determined to be dissimilar to the global vector among the areas as a main subject.

(8)

The image processing device according to any one of (1) to (7), wherein, when image data that is subjected to a change of an imaging direction is set as a target of a main subject determination process, the main subject determination unit determines a main subject based on an area that has the local motion that has been determined to be dissimilar to the global motion.

(9)

The image processing device according to (8), wherein, when image data that is not subjected to a change of an imaging direction is set as a target of the main subject determination process, the main subject determination unit obtains a degree of stable presence of each of candidate images extracted from the image data within the image data spanning a plurality of frames, and determines a main subject from the candidate images using the degree of stable presence.

(10)

The image processing device according to any one of (1) to (9), wherein the main subject determination unit sets an image of an area of which the local motion is determined to be dissimilar to the global motion among the areas as a candidate image, obtains a degree of stable presence of candidate images within image data spanning a plurality of frames, and determines a main subject from the candidate images using the degree of stable presence.

(11)

The image processing device according to any one of (1) to (10), wherein, when the global motion is detected to be great and the local motion is detected to be small among the areas, the main subject determination unit determines a main subject based on an area of which the local motion is determined to be dissimilar to the global motion.

(12)

The image processing device according to any one of (1) to (11), wherein the local motion refers to a local vector of each of areas in an image detected through an image analysis process, and wherein the global motion refers to a global vector detected using the local vector of each of the areas.

(13)

The image processing device according to any one of (1) to (11), wherein the global motion detection unit is formed by a motion sensor that detects motions of an imaging apparatus that obtains image data.

REFERENCE SIGNS LIST 1 image processing device
2 main subject determination unit
3 local motion detection unit
4 global motion detection unit
10 imaging apparatus
11 optical system
12 imager
13 optical system drive unit
14 sensor unit
15 recording unit
16 communication unit
20 digital signal processing unit
21 pre-processing unit
22 synchronization unit
23 YC generation unit
24 resolution conversion unit
25 codec unit
27 motion vector detection unit
28 candidate detection unit
30 control unit
30a main subject determination unit
32 UI controller
33 user interface
34 display unit
35 manipulation unit
70 computer device
71 CPU

The invention claimed is:

1. An image processing device comprising:
circuitry configured to:
detect a global motion indicating a motion of an image resulting from movement of a camera;
process the image to detect a local motion indicating motion of each area of a plurality of areas of the image, each area being less than a whole of the image;
determine one of the plurality of areas as including a main subject based on the global motion and local motion of each of the plurality of areas; and
when image data that is subjected to a change of an imaging direction is set as a target of a main subject determination process, use a first mode to determine the main subject as an area that has a local motion that is different from the global motion,
wherein when the global motion is detected to be larger than the local motion, the circuitry determines the main subject based on an area of which a difference between the local motion and the global motion exceeds a predetermined threshold for a predetermined amount of time.

2. The image processing device according to claim 1, wherein the circuitry determines an area of the image in which the local motion and the global motion remain different from each other as including the main subject.

3. The image processing device according to claim 2, wherein the circuitry determines that the area in which the local motion and the global motion remain different from each other based on a predetermined time condition including a continuous, cumulative, or average time.

4. The image processing device according to claim 1, wherein the circuitry determines a main subject based on a reliability of the local motion and the global motion.

5. The image processing device according to claim 1, wherein the circuitry determines an image extracted from an area of the image in which the local motion is different from the global motion as the main subject.

6. The image processing device according to claim 1, wherein the circuitry determines an image of an area selected from areas of which the local motion is different from the global motion as the main subject.

7. The image processing device according to claim 1, wherein, when image data that is not subjected to a change of an imaging direction is set as a target of the main subject determination process, the circuitry uses a second mode to obtain a degree of stable presence of each of candidate images extracted from the image data within the image data spanning a plurality of frames, and determines the main subject from the candidate images using the degree of stable presence.

8. The image processing device according to claim 1, wherein the circuitry sets an image of an area of which the local motion is different from the global motion as a candidate image, obtains a degree of stable presence of candidate images within image data spanning a plurality of frames, and determines the main subject from the candidate images using the degree of stable presence.

9. The image processing device according to claim 1,
wherein the local motion refers to a local vector of each of areas in an image detected through an image analysis process, and
wherein the global motion refers to a global vector detected using the local vector of each of the areas.

10. The image processing device according to claim 1, wherein the circuitry includes a motion sensor that detects motions of an imaging apparatus that obtains image data.

11. An image processing method comprising:
detecting, with circuitry, a global motion that indicates a motion of an image resulting from movement of a camera;
processing, with circuitry, the image to detect a local motion that indicates a motion of each area of a plurality of areas of the image, each area being less than a whole of the image; determining, with the circuitry, one of the plurality of areas as including a main subject based on the global motion and local motion of each of the plurality of areas; and
when image data that is subjected to a change of an imaging direction is set as a target of a main subject determination process, using a first mode, by the circuitry, to determine the main subject as an area that has a local motion that is different from the global motion,
wherein when the global motion is detected to be larger than the local motion, the main subject is determined based on an area of which a difference between the local motion and the global motion exceeds a predetermined threshold for a predetermined amount of time.

12. A non-transitory computer-readable medium encoded with computer-readable instructions thereon that, when executed by circuitry, cause the circuitry to perform a method comprising:
acquiring a global motion that indicates a motion of an image resulting from movement of a camera;
processing the image to acquire a local motion that indicates a motion of each area of a plurality of areas of the image, each area being less than a whole of the image; and
determining one of the plurality of areas as including a main subject based on the global motion and local motion of each of the plurality of areas; and when image data that is subjected to a change of an imaging direction is set as a target of a main subject determination process, using a first mode to determine the main subject as an area that has a local motion that is different from the global motion,
wherein when the global motion is detected to be larger than the local motion, the main subject is determined based on an area of which a difference between the local motion and the global motion exceeds a predetermined threshold for a predetermined amount of time.

13. The image processing device according to claim 1, wherein the determination of the main subject is within a predetermined period of time that includes a first period and a second period.

14. The image processing device according to claim 13, wherein the first period is a period of time starting from comparison of a global motion vector and a local motion vector, within which a difference between the global motion and the local motion exceeds a predetermined threshold value.

15. The image processing device according to claim 14, wherein the second period is a period of time after the first period.

16. The image processing device according to claim 7, wherein the degree of stable presence is an index value that indicates whether a subject is present in a predetermined area of the image for a predetermined length of time.

17. A hand-held camera comprising:
circuitry configured to:
capture an image;
detect a global motion indicating a motion of the image resulting from movement of a camera;
process the image to detect a local motion indicating motion of each area of a plurality of areas of the image, each area being less than a whole of the image; and
determine one of the plurality of areas as including a main subject based on the global motion and local motion of each of the plurality of areas, and
when image data that is subjected to a change of an imaging direction is set as a target of a main subject determination process, use a first mode to determine the main subject as an area that has a local motion that is different from the global motion,
wherein when the global motion is detected to be larger than the local motion, the circuitry determines the main subject based on an area of which a difference between the local motion and the global motion exceeds a predetermined threshold for a predetermined amount of time.

* * * * *